(12) United States Patent
Kashiwagi et al.

(10) Patent No.: US 9,563,004 B2
(45) Date of Patent: *Feb. 7, 2017

(54) IMAGE SOURCE UNIT AND IMAGE DISPLAY UNIT

(71) Applicant: DAI NIPPON PRINTING CO., LTD., Tokyo-to (JP)

(72) Inventors: Tsuyoshi Kashiwagi, Tokyo-to (JP); Nobuo Naito, Hwaseong-si (KR)

(73) Assignee: DAI NIPPON PRINTING CO., LTD., Tokyo-to (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/972,710

(22) Filed: Dec. 17, 2015

(65) Prior Publication Data

US 2016/0103262 A1 Apr. 14, 2016

Related U.S. Application Data

(63) Continuation-in-part of application No. 12/911,291, filed on Oct. 25, 2010, now Pat. No. 9,244,204.

(30) Foreign Application Priority Data

Oct. 27, 2009 (JP) .................. 2009-246861
Jul. 1, 2010 (JP) .................. 2010-150796

(51) Int. Cl.
*F21V 9/00* (2015.01)
*F21V 8/00* (2006.01)
(Continued)

(52) U.S. Cl.
CPC ............. *G02B 6/005* (2013.01); *G02B 5/003* (2013.01); *G02B 5/223* (2013.01); *G02B 6/0056* (2013.01); *G02B 3/005* (2013.01); *G02B 5/208* (2013.01)

(58) Field of Classification Search
CPC ......... G02B 6/005; G02B 5/223; G02B 5/003; G02B 6/0056; G02B 5/208; G02B 3/005
See application file for complete search history.

(56) References Cited

U.S. PATENT DOCUMENTS 6,031,591 A 2/2000 Hamanaka
7,956,528 B2 6/2011 Nabeta
(Continued)

FOREIGN PATENT DOCUMENTS

JP 02-097904 A 4/1990
JP 11-145678 A 5/1999
(Continued)

OTHER PUBLICATIONS

International Search Report mailed Feb. 2, 2011;PCT/JP2010/068984.
(Continued)

*Primary Examiner* — Donald Raleigh
(74) *Attorney, Agent, or Firm* — Ladas & Parry LLP

(57) ABSTRACT

Provided is an image source unit for improving use efficiency of the image light, including: a light source; and an optical sheet, the optical sheet including: a base material layer; an optical functional layer; and an adhesive layer, the optical functional layer including: light-transmissive portions arranged in parallel; and light-absorbing portions arranged between the light-transmissive portions, whose refractive index is set smaller than that of the light-transmissive portions, the light source side face of the light-transmissive portions includes unit light input control elements so that the elements project towards the light source side, the light-absorbing portions not being arranged between the unit light input control elements, the light source side face of the light-absorbing portions having a recess so that the bottom of the recess faces the opposite side (Continued)

from the light source, the adhesive layer is laminated on a light source side face of the optical functional layer.

6 Claims, 20 Drawing Sheets

(51) Int. Cl.
  *G02B 5/00* (2006.01)
  *G02B 5/22* (2006.01)
  *G02B 3/00* (2006.01)
  *G02B 5/20* (2006.01)

(56) References Cited

U.S. PATENT DOCUMENTS

| | | | |
|---|---|---|---|
| 9,244,204 B2* | 1/2016 | Kashiwagi | G02B 5/003 362/257 |
| 2003/0107314 A1 | 6/2003 | Urabe et al. | |
| 2005/0118380 A1* | 6/2005 | Hirata | G03F 7/11 428/64.4 |
| 2005/0161774 A1* | 7/2005 | Saimoto | C09J 7/0207 257/642 |
| 2005/0253493 A1 | 11/2005 | Park et al. | |
| 2006/0103779 A1 | 5/2006 | Amemiya et al. | |
| 2007/0160811 A1 | 7/2007 | Gaides et al. | |
| 2008/0074742 A1* | 3/2008 | Kim | B29D 11/00278 359/463 |
| 2008/0278663 A1* | 11/2008 | Krishnan | B29C 39/148 349/95 |
| 2008/0297908 A1* | 12/2008 | Adachi | G02B 3/0056 359/599 |
| 2009/0026909 A1* | 1/2009 | Cha | H01J 11/12 313/112 |
| 2009/0033222 A1* | 2/2009 | Park | G02B 5/282 313/582 |
| 2009/0079336 A1 | 3/2009 | Yamada et al. | |
| 2009/0224669 A1 | 9/2009 | Park et al. | |
| 2009/0256478 A1* | 10/2009 | Kawasaki | H01J 9/02 313/582 |
| 2010/0014313 A1 | 1/2010 | Tillin et al. | |
| 2011/0043920 A1 | 2/2011 | Chun et al. | |

FOREIGN PATENT DOCUMENTS

| | | |
|---|---|---|
| JP | 2000-275432 A | 10/2000 |
| JP | 2001-188121 A | 7/2001 |
| JP | 2001-350013 A | 12/2001 |
| JP | 2002-131530 A | 5/2002 |
| JP | 2004-062084 A | 2/2004 |
| JP | 2006-189867 A | 7/2006 |
| JP | 2006-201577 A | 8/2006 |
| JP | 2007-096111 A | 4/2007 |
| JP | 2008-046644 A | 2/2008 |
| JP | 2008-299225 A | 12/2008 |
| JP | 2009-058658 A | 3/2009 |
| JP | 2009-080198 A | 4/2009 |
| JP | 2009-139403 A | 6/2009 |
| JP | 2009-139493 A | 6/2009 |
| JP | 2009-524080 A | 6/2009 |
| JP | 2009-169007 A | 7/2009 |
| JP | 2010-533311 A | 10/2010 |
| WO | 2009/008657 A2 | 1/2009 |

OTHER PUBLICATIONS

USPTO NFOA dated Aug. 30, 2012 in connection with U.S. Appl. No. 12/911,291.
USPTO FOA dated Mar. 29, 2013 in connection with U.S. Appl. No. 12/911,291.
USPTO NFOA dated Sep. 6, 2013 in connection with U.S. Appl. No. 12/911,291.
USPTO NOA dated Feb. 20, 2014 in connection with U.S. Appl. No. 12/911,291.
USPTO FOA dated Sep. 9, 2014 in connection with U.S. Appl. No. 12/911,291.
USPTO NFOA dated Jan. 28, 2015 in connection with U.S. Appl. No. 12/911,291.
USPTO NOA dated Sep. 28, 2015 in connection with U.S. Appl. No. 12/911,291.
USPTO NFOA dated May 14, 2014 in connection with U.S. Appl. No. 12/911,291.

* cited by examiner (IMAGE LIGHT SOURCE SIDE) (OBSERVER SIDE)

IMAGE SOURCE UNIT AND IMAGE DISPLAY UNIT

BACKGROUND OF THE INVENTION

Field of the Invention

The present invention relates to an image source unit and an image display unit comprising the image source unit.

Description of the Related Art

An image display unit which projects an image to the observer side is provided with an image source unit comprising: an image light source; and an optical sheet comprising a layer having various functions for raising the quality of image light emitted from the image light source and projecting the image to the observer side.

For example, in a case of a plasma display as one of the image display units, when the observer side is bright, the contrast of the display is insufficient and thereby the quality of the image is deteriorated. In such a plasma display, an optical functional layer is sometimes provided to the optical sheet of the image source unit so as to improve the contrast. The optical functional layer has light-transmissive portions and light-absorbing portions and can adequately shield the external light. The term "contrast" means the ratio between the brightness of the white portion showing maximum brightness (it is called "white brightness") and the brightness of the black portion showing minimum brightness (it is called "black brightness") when displaying black-and-white image.

Such an optical functional layer is disclosed in, for example, Patent document 1 (Japanese Patent Application Laid-open (JP-A) No. 2006-189867) as an external light shielding layer which comprises: a filter base; and an external light shielding layer being formed on one surface of the filter base, and comprising: a transparent resin-made base, and wedge-shaped black stripes arranged parallel on one surface of the transparent resin-made base.

Patent document 2 (JP-A No. 02-097904) discloses a light-control film which is a transparent film and comprises a first and a second main surfaces, wherein the first main surface has a plurality of grooves and the grooves are filled with a light-absorbing material.

Patent document 3 (JP-A No. 2009-058658) discloses an optical sheet comprising a light-transmissive layer having prism lines arranged parallel, wherein each of the width of the prism lines is narrower toward a top end and the intersectant portion of the upper face and the oblique face of the prism lines has roundness having a radius of curvature of 3-30 μm.

Patent document 4 (JP-A No. 2009-080198) discloses an optical sheet which is arranged at an observer side from an image light source and which comprises a plurality of layers controlling the light emitted from the image light source and transmitting the light to the observer side. In the optical sheet, at least one layer of the plurality of layers is an optical functional layer comprising light-transmissive prism portions arranged parallel along the sheet face and light-absorbing portions arranged between the light-transmissive prism portions; and at least one base of the light-absorbing portion in cross section in the sheet-thickness direction has a recess having a curved or polygonal line so that the at least one side of the light-absorbing portion in cross section in the sheet-thickness direction projects towards the sheet thickness direction.

Patent document 5 (JP-A No. 2008-046644) discloses a plasma display device comprising: a plasma display panel; and a filter formed on the entire surface of the panel, wherein the filter comprises a base unit; and an external light shielding sheet including a plurality of pattern units formed on the base unit, wherein the bottom stage of the pattern unit which is wider than the upper stage of the pattern unit is formed in a recessed shape.

SUMMARY OF THE INVENTION

The above-described optical functional layer can improve contrast of the image display unit by absorbing light. However, a part of image light which is desired not to be absorbed but to be emitted to the observer side even tends to be absorbed; so, the use efficiency of the image light tends to be deteriorated. In some cases, improving use efficiency by improving the front brightness by converging the image light at the front so as to reduce the power consumption as a whole, are desired.

In the filter for a display unit of Patent document 1, among image lights incoming into the base made of a transparent resin material, an image light incoming at an angle larger than an angle formed by the normal line of the sheet face is absorbed by the wedge-shaped black stripes. Therefore, transmissivity of the image light lowers and thereby use efficiency of the image light degreases, which are problematic.

The invention of Patent document 2 states that there is an effect to improve transmissivity of the image light within the view angle range of ±30° by using curved surface of the light-transmissive portion. However, the invention only has a feature regarding the shape of light-transmissive portion; so, further improvement is required.

In the invention of Patent document 3, so as to improve moldability of thermoplastic resin, roundness is given to the corners of the prism lines. However, by merely giving roundness of a certain curvature at the corners of the prism lines, the expected optical effect cannot be obtained.

The invention of Patent document 4 obtains an effect of improving light transmissivity by forming recess portions in the light-absorbing portions. However, by only the modification of the structure, the effect of improving transmissivity of the image light is insufficient.

In addition, the invention of Patent document 5 does not consider the issue to improve transmissivity of the image light.

Accordingly, the present invention is to provide an image source unit which is capable of improving use efficiency of the image light. The invention also provides an image display unit comprising the image source unit.

Hereinafter, the present invention will be described. In order to make the understanding of the present invention easier, reference numerals of the attached drawings are quoted in brackets; however, the present invention is not limited by the embodiment shown in the drawings.

The first aspect of the present invention is an image source unit including: a light source; and an optical sheet laminated on the light source, wherein the optical sheet includes: a base material layer; an optical functional layer formed on the light source side surface of the base material layer; and an adhesive layer, the optical functional layer includes: light-transmissive portions extending in one direction and arranged parallel in a direction different from said one direction in a light transmissive manner along the sheet face, having elastic modulus of 800 MPa or more and 2000 MPa or less; and light-absorbing portions arranged between the light-transmissive portions, whose refractive index is set smaller than that of the light-transmissive portions, the light source side face of the light-transmissive portions include unit light input control elements so that the unit light input control elements project towards the light source side in cross section in the sheet-thickness direction, the light-absorbing portions not being arranged between the unit light input control elements, the light source side face of the light-absorbing portions has a recess portion so that the bottom of the recess portion faces the opposite side from the light source and formed in curved or polygonal manner in cross section in the sheet-thickness direction, wherein depth of the recess portion of the light-absorbing portion is in the range of 0.5-6 μm, the adhesive layer is layered on the light source side face of the optical functional layer and has a refractive index lower than that of the light-transimissive portions, and the storage elastic modulus of an adhesive for forming the adhesive layer is 0.22 MPa or more and 0.8 MPa or less.

The second aspect of the invention is the image source unit according to the first aspect, wherein the light absorbing portion is arranged in a light absorbing manner by being filled with a material which includes light-absorbing particles having an average diameter of 1.0 μm or more and 20 μm or less dispersed in a binder at a rate of 3 mass % or more and less than 10 mass %.

The third aspect of the invention is the image source unit according to the first aspect, wherein the light source side of the light-absorbing portions is covered with a covering layer.

The fourth aspect of the invention is the image source unit according to the first aspect, wherein the thickness of the adhesive layer is 20 μm or more and 50 μm or less.

The fifth aspect of the invention is the image source unit according to the first aspect, wherein the unit light input element and a reflection type polarizing plate are bonded to each other by an adhesive.

The sixth aspect of the present invention is an image display unit including the image source unit according to the first aspect.

According to the invention, it is possible to efficiently use image light emitted from the image light source.

DESCRIPTION OF THE PREFERRED EMBODIMENTS

Figure 1:
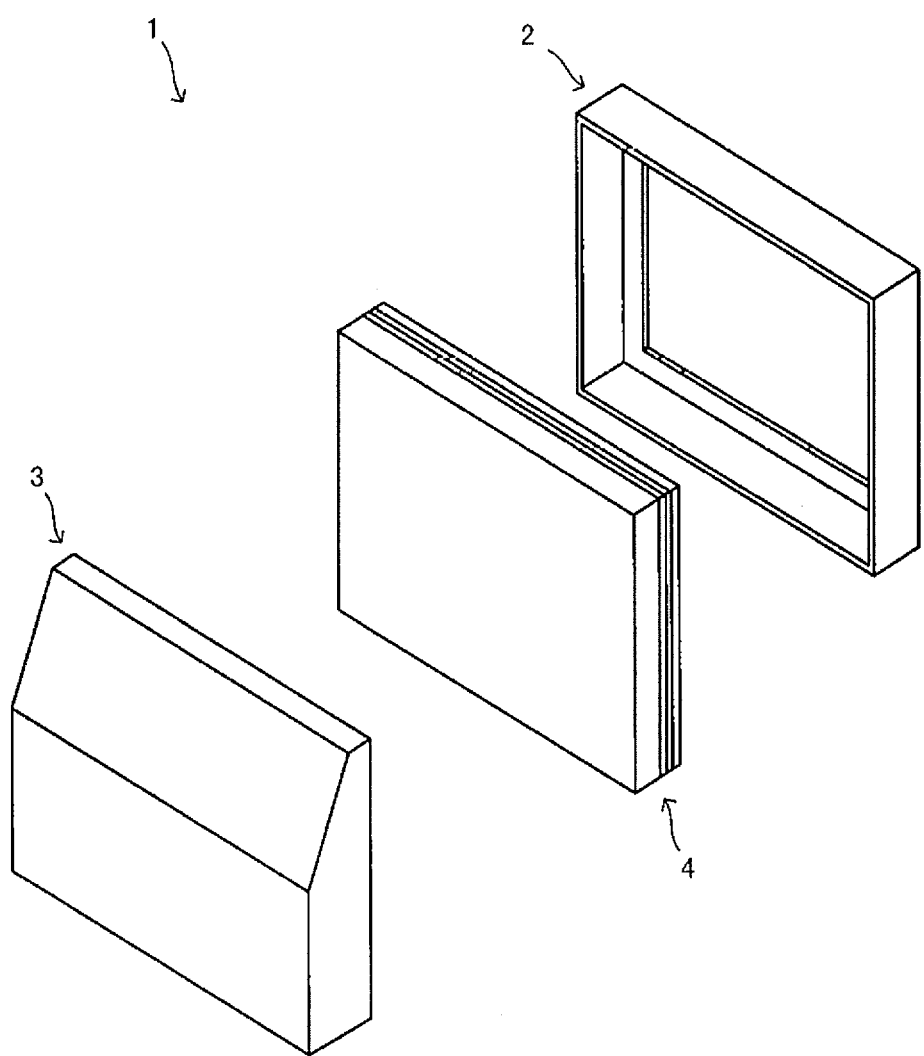
FIG. 1 is a schematic view showing a structure of an image display unit.

The aforementioned functions and benefits of the present invention will be apparent from the following modes for carrying out the invention. Hereinafter, the invention will be described based on the embodiments shown in the drawings. However, the invention is not limited to these embodiments.

FIG. 1 is an exploded perspective view schematically showing a plasma television 1 as an image display unit which comprises an image source unit 4 according to a first embodiment of the invention. In FIG. 1, the upper right side of the drawing is the observer side and the lower left side of the drawing is the back side of the plasma television. As seen from FIG. 1, the plasma television 1 comprises a plasma display panel unit 4 (PDP unit 4) as an image source unit 4 which is incorporated in a housing formed by a front housing 2 and rear housing 3.

Other than the PDP unit 4, the plasma television 1 may comprise various devices conventionally provided to plasma televisions in its housing. Examples of the devices may be various electric circuits and cooling means.

Figure 2:
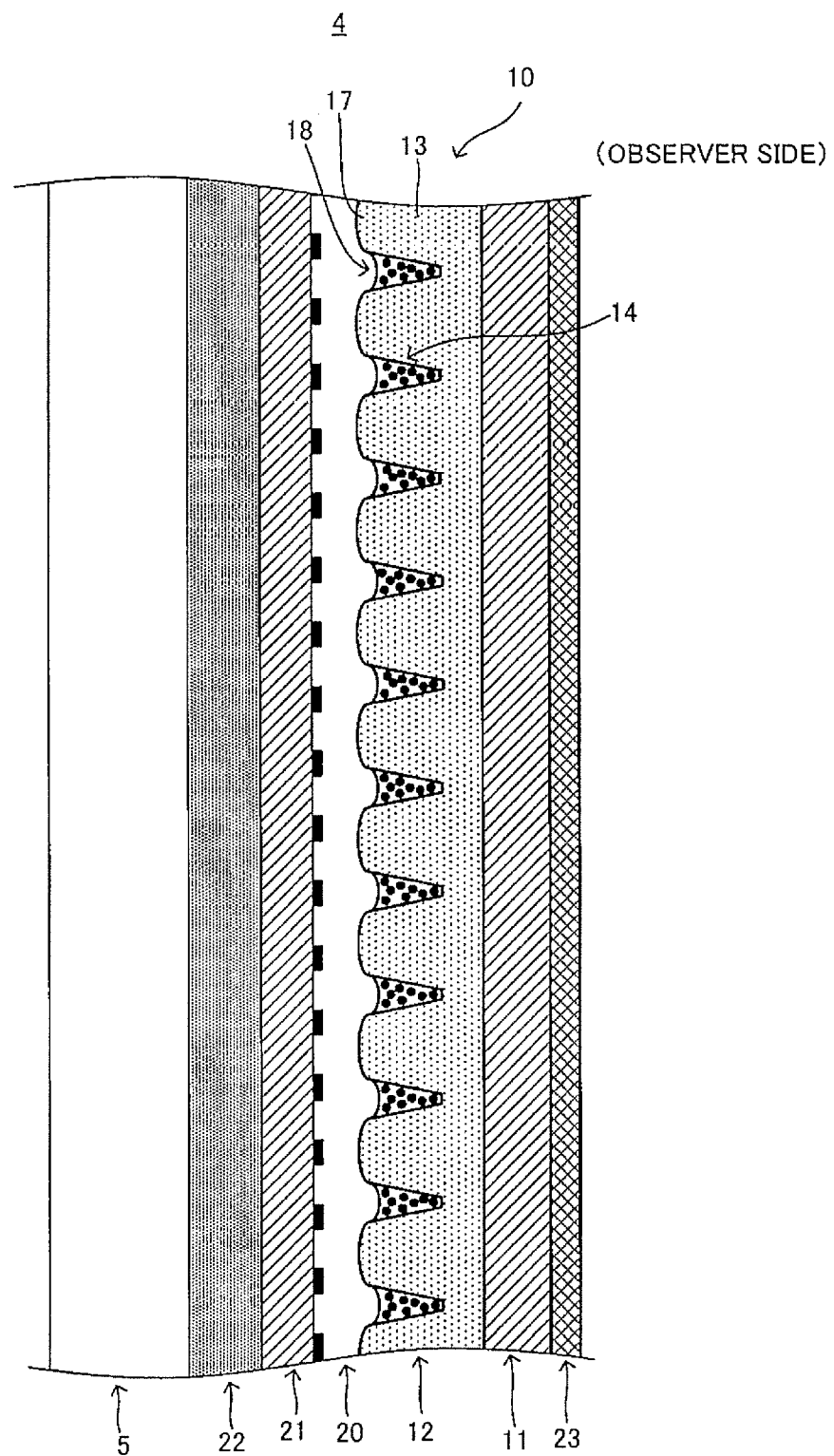
FIG. 2 is a cross-sectional view schematically showing a part of the image source unit of the first embodiment of the present invention.

FIG. 2 schematically shows a structure of the PDP unit 4. In FIG. 2, the right side of the drawing is the observer side. The PDP unit 4 comprises: a display panel 5 (PDP 5) as an image light source; and an optical sheet 10 disposed at the image light outgoing side of the PDP 5. In FIG. 2, for viewability, the repeating reference numerals and reference numerals of unexplained elements are partly omitted (same in the following figures).

The PDP 5 can be a conventional plasma display panel. Next, the optical sheet 10 will be described.

The optical sheet 10 is a sheet shape member which is arranged at the observer side from the image light source and which controls an incident light from the image light source side and transmits the light to the observer side. The optical sheet 10 has a plurality of layers; as shown in FIG. 2, the optical sheet 10 at least comprises: a base material layer 11; and an optical functional layer 12 formed on the image light source side surface of the base material layer 11. In addition, the embodiment of the optical sheet 10 shown in FIG. 2 also comprises: an adhesive layer 20; an electromagnetic wave shielding layer 21; a wavelength filter layer 22; and an antireflection layer 23. Hereinafter, each layer will be described.

The base material layer 11 is a layer to be the base for forming the optical functional layer 12 as described below in detail. The base material layer 11 is preferably constituted by a material containing polyethylene terephthalate (PET) as the main component. When the base material layer 11 contains PET as the main component, the base material layer 11 may contain other resins. In addition, various additives may be adequately added thereto. Examples of conventional additives include: antioxidant such as phenol-based compounds and stabilizer such as lactone-based compounds. The term "main component" means that 50 mass % or more of PET is contained based on the whole material for forming the base material (hereinafter, it means the same).

The main component of the material constituting the base material layer 11 is not necessarily PET; other materials can be used. Examples of other materials include: polyester-based resin such as polybutylene terephthalate, polyethylene naphthalate, terephthalic acid-isophthalic acid-ethylene glycol copolymer, and terephthalic acid-cyclohexane dimethanol-ethylene glycol copolymer; polyamide-based resin such as nylon 6; polyolefin-based resin such as polypropylene and polymethyl penten; acrylic resin such as polymethyl methacrylate; styrene-based resin such as polystyrene and styrene-acrylonitrile copolymer; cellulose-based resin such as triacetylcellulose; imide-based resin; and polycarbonate resin. To these resins, as required, additives such as ultraviolet absorber, filler, plasticizer, and antistatic agent may be adequately added.

In this embodiment, in view of mass production, cost, and availability as well as its performance, a base material layer 11 is made of a resin mainly containing PET as a preferable mode of the invention.

Figure 3:
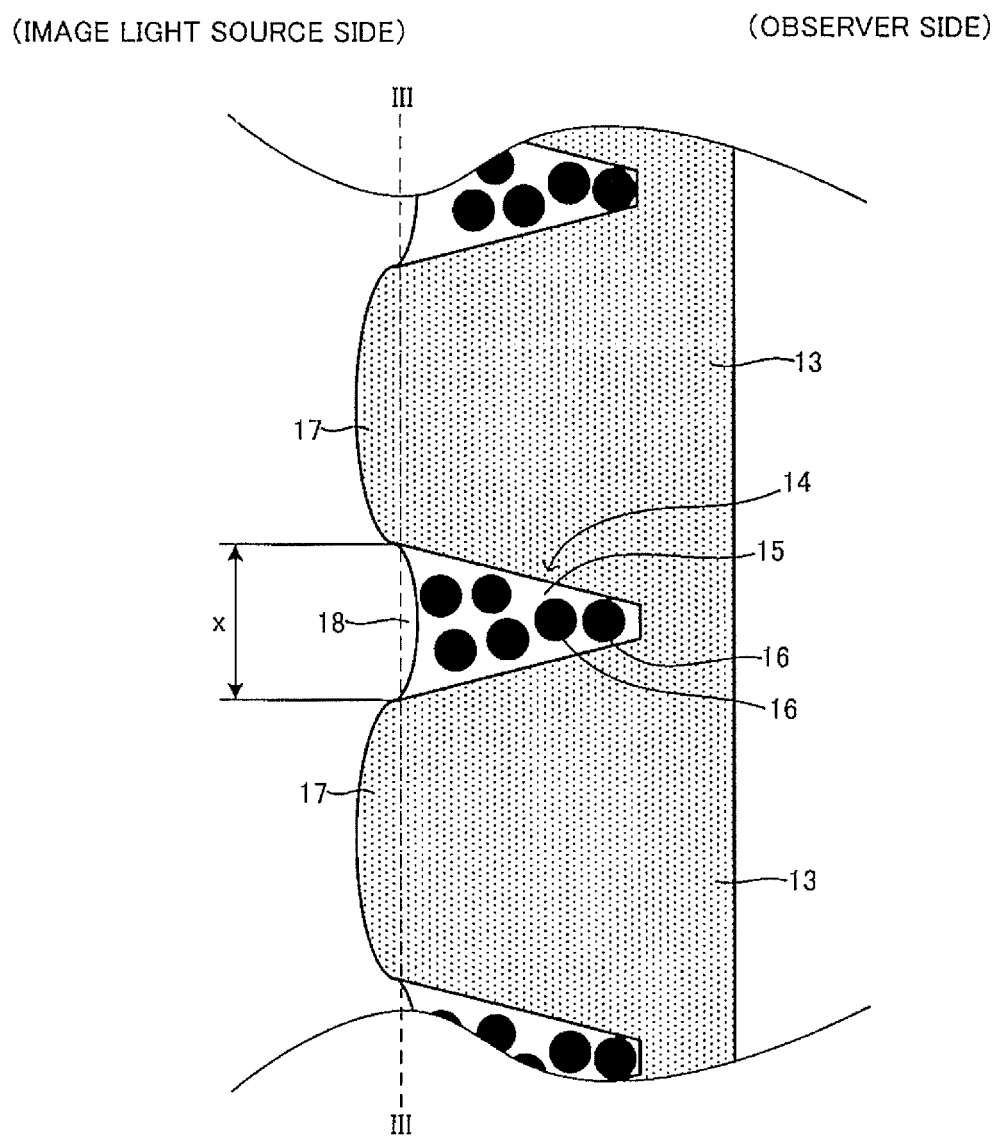
FIG. 3 is an enlarged plan of a part of the optical functional layer of the optical sheet provided to the image source unit shown in FIG. 2.

The optical functional layer 12 is a layer for controlling optical path of the image light incoming from the image light source side and for adequately absorbing stray light and external light. The optical functional layer 12 has a cross section shown in FIG. 2 and extends from the front to the back of the drawing. FIG. 3 is an enlarged plan of one of the light-absorbing portions 14 and the adjacent light-transmissive portions 13 of the optical functional layer 12 in the optical sheet 10 shown in FIG. 2. The optical functional layer 12 will be more specifically described with reference to FIGS. 2, 3, and other adequately indicated drawings.

The light-transmissive portions 13 has a function to transmit an image light and are arranged so that a shorter upper base and a longer lower base in the substantially trapezoid cross-section are arranged in a direction along the sheet plane of the optical sheet 10. When the optical sheet 10 is arranged in the image display unit, the shorter upper base in the substantially trapezoid cross-section faces the image light source side. It should be noted that the cross-section of the face of the shorter upper base of one light-transmissive portion 13 (i.e. the image light source side) projects in a curved or polygonal manner; and the light-transmissive portion 13 has a protrusion 17 at the image light source side. The term "projects in a curved or polygonal manner" means a line which is obtained by connecting both ends of the light-absorbing portion 14 of the image light source side face in the cross section (see broken line in FIG. 3.) projects in a curved or polygonal manner toward the image light source side. Thus, to be exact, the cross-sectional shape of the light-transmissive portion 13 is not trapezoid.

The light-transmissive portions 13 have a refractive index $N_p$ and such light-transmissive portions 13 can be made by curing a composition for constituting the below-described light-transmissive portion. The value of refractive index $N_p$ is not particularly limited; in view of availability of the material to be applied, 1.49-1.56 is preferable.

The composition for forming the light-transmissive portion is preferably, for example, a light curable resin composition in which a light-curable prepolymer (P1), a reactive diluent monomer (M1), a mold release agent (S1), and a photopolymerization initiator (I1) are mixed.

Examples of the light-curable prepolymer (P1) include: prepolymer such as epoxy acrylate-based, urethane acrylate-based, polyether acrylate-based, polyester acrylate-based, and polythiol-based prepolymer.

Examples of the reactive diluent monomer (M1) include: vinylpyrrolidone, 2-ethylhexyl acrylate, β-hydroxy acrylate, and tetrahydrofurfuryl acrylate.

Examples of the mold release agent (S1) include: a salt of phosphate ester of tetradecanol ethylene oxide 10 mole-adduct/lauryl dimethyl amine; a salt of phosphate ester of tetradecanol ethylene oxide 10 mole-adduct/dimethyl stearyl amine; a salt of phosphate ester of lauryl alcohol ethylene oxide 2 mole-adduct/ethylene oxide 10 mole-adduct of lauryl amine; a salt of phosphate ester of tetradecanol ethylene oxide 2 mole-adduct/ethylene oxide 10 mole-adduct of stearyl amine; and a salt of phosphate ester of stearyl alcohol ethylene oxide 10 mole-adduct/ethylene oxide 15 mole-adduct of stearyl amine.

Examples of the photopolymerization initiator (I1) include: hydroxybenzoyl compounds such as 2-hydroxy-2-methyl-1-phenylpropane-1-one, 1-hydroxycyclohexyl phenyl ketone, and benzoin alkyl ether; benzoyl formate compounds such as methyl benzoyl formate; thioxanthone compounds such as isopropyl thioxanthone; benzophenones such as benzophenone; acylphosphine oxide compounds such as 1,3,5-trimethylbenzoyl diphenylphosphine oxide, bis(2,4,6-trimethylbenzoyl)phenylphosphine oxide; and benzyl dimethyl ketal. Among them, the preferable ones in view of color protection of the light-transmissive portions 13, 13, . . . are 2-hydroxy-2-methyl-1-phenylpropane-1-one, 1-hydroxycyclohexyl phenyl ketone, and bis(2,4,6-trimethyl benzoyl)phenylphosphine oxide. It should be noted that the amount of the photopolymerization initiator (I1) to be contained is preferably 0.5-5.0 mass % based on a total mass of the composition for forming the light-transmissive portion (100 mass %).

The light-curable prepolymer (P1), the reactive diluent monomer (M1), the mold release agent (S1), and the photopolymerization initiator (I1) to be used may respectively be single species or a combination of two or more species thereof.

As required, for property modification as well as improvement of coating properties and of mold releasability from the die roll when using die roll in the production process, various additives such as silicone-based additive, rheology control agent, antifoaming agent, antistatic agent, and ultraviolet absorber can be added to the composition for forming the light-transmissive portion.

Next, the light-absorbing portion 14 will be described. The light-absorbing portion 14 is arranged between the neighboring light-transmissive portions 13; the light-absorbing portion 14 is an element having a substantially trapezoid shape in cross section shown in FIGS. 1 and 2. The shorter upper base of the substantially trapezoid in cross section is arranged at the longer lower base side of the light-transmissive portion 13 and the longer lower base of the light-absorbing portion 14 is arranged at the shorter upper base side of the light-transmissive portion. It should be noted that in the case of this embodiment, the face equivalent to the longer lower base of the substantially trapezoid cross section (i.e. the image light source side face) has a recess formed in a curved or polygonal manner; and the light-absorbing portion 14 has a recess portion 18 at the image light source side. The term "a recess portion" means an area recessed toward the observer side (i.e. base material layer 11 side) to the above-described broken line in FIG. 3. The depth of the recess portion 18 is preferably 0.5 μm or more and 6.0 μm or less. When the depth of the recess portion 18 is less than 0.5 μm, the below-described effect to diffuse the image light may be reduced. On the other hand, when the depth of the recess portion 18 exceeds 6.0 μm, in a case of applying an adhesive to the face having the recess portion 18 so as to laminate other layers, the adhesive tends not to follow the recess portion even after autoclave treatment; as a result, bubbles may be incorporated. The oblique line of the substantially trapezoid cross section preferably intersects with the normal to the plane of the optical sheet at an angle of 00 or more and 10° or less. When the angle of the oblique line is nearly 0°, the cross section of the light-absorbing portion 14 is no longer substantially trapezoid, but rectangle.

Figure 4A:
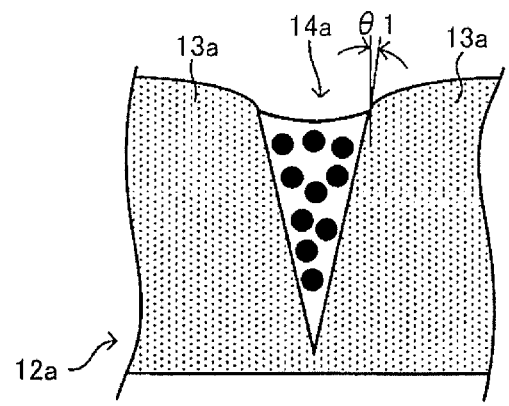
FIG. 4A is a plan showing an example of the light-absorbing portion having a triangle cross section.
Figure 4B:
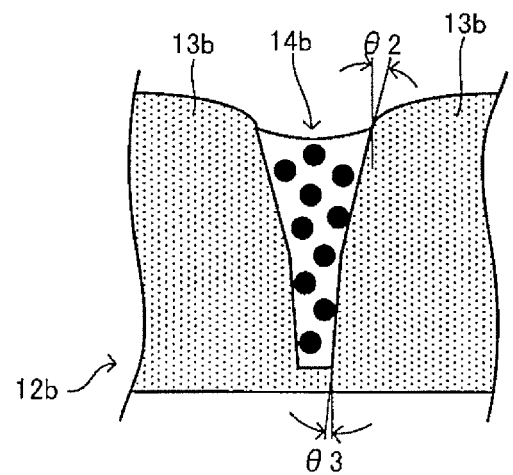
FIG. 4B is a plan showing another example of the light-absorbing portion of which oblique line in cross section is a polygonal line.
Figure 4C:
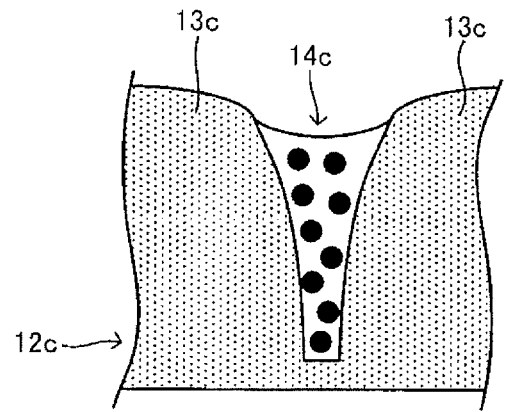
FIG. 4C is a plan showing another example of the light-absorbing portion of which oblique line in cross section is a curved line.

Although the above description states that the cross-sectional shape of the light-absorbing portion is a substantially trapezoid shape having two linear oblique lines, the present invention is not limited to the shape. Other examples of cross section of the light-absorbing portion are shown in FIGS. 4A, 4B, and 4C. FIG. 4A is a plan showing an example of the light-absorbing portion 14a having a triangle cross section; FIG. 4B is a plan showing another example of the light-absorbing portion 14b of which oblique line in cross section is a polygonal line; and FIG. 4C is a plan showing another example of the light-absorbing portion 14c of which oblique line in cross section is a curved line;

In the case of FIG. 4A, the cross-sectional shape of the light-absorbing portion 14a is substantially triangle. More specifically, the base of the substantially triangle is arranged between the shorter upper bases of the neighboring light-transmissive portions 13a; the apex of the triangle to the base is arranged at the base material layer side (i.e lower side of the drawing). The oblique line of the substantially triangle intersects with the normal to the output plane of the optical sheet at an angle of θ1. The angle θ1 is preferably in a range of more than 0° and 10° or less; more preferably more than 0° and 6° or less.

In the case of FIG. 4B, an oblique line of the light-absorbing portion 14b (an oblique line of the light-transmissive portions 13b, 13b) consists of two lines, but not a single line. In other words, the cross-sectional shape has a polygonal oblique line. More specifically, the lower base side oblique line (i.e. upper side of FIG. 4B) makes an angle of θ2 with a normal to the output plane of the optical sheet. The apex side oblique line (i.e. lower side of FIG. 4B) makes an angle of θ3 with a normal to the output plane of the optical sheet. There is a relation: θ2>θ3. Both θ2 and θ3 are preferably within the range of more than 0° and 10° or less, and more preferable angles are within the range of more than 0° and 6° or less. Although FIG. 4B shows an example of the light-absorbing portion each of which oblique line consists of two oblique lines, the oblique line may be a polygonal line having more than two lines.

In the case of FIG. 4C, the oblique line of the light-absorbing portion 14c (i.e. also the oblique line of the light-transmissive portions 13c) is a curved line. In this way, the oblique line of the substantially trapezoid cross-sectional shape of the light-absorbing portion may be a curved line. Even in this case, the angle between the curved line and the normal to the output plane of the optical sheet at the upper-base-side (lower side in FIG. 4C) is preferably smaller than the angle at the lower-base-side (upper side in FIG. 4C). In addition, every angle on the curved line is preferably within the range of more than 0° and 10° or less, and more preferably within the range of more than 0° and 6° or less. The angle between the curved line and the normal to the output plane of the sheet is defined by an angle between the normal to the output plane of the sheet and lines made by dividing a curved line into ten equal parts and connecting two adjacent ends of the segments.

The shape of the light-absorbing portion is not limited to the examples; it can be adequately modified as long as the shape is suitable for absorbing the external light. For example, substantially rectangle cross-sectional shape may be possible. It should be noted that any shape of the light-absorbing portion of the embodiment has a recess portion at the image light source side of the optical functional layer in a curved or polygonal manner.

The light-absorbing portions 14 are formed of a certain material having a refractive index of $N_b$ which is smaller than refractive index $N_p$ of the light-transmissive portion 13. By setting the relation between the refractive index $N_p$ of the light-transmissive portions 13 and the refractive index $N_b$ of the light-absorbing portions 14 as $N_p > N_b$, it is possible to adequately reflect an image light emitted from the light source which enters into the light-transmissive portions 13 based on Snell's law under certain conditions at an interface between light-absorbing portions 14 and the light-transmissive portions 13. The light entering into the light-absorbing portion based on Snell's law is absorbed. The difference between the refractive indexes $N_p$ and $N_b$ are not particularly limited; it is preferably more than 0 and 0.06 or less, more preferably more than 0 and 0.02 or less, furthermore preferably more than 0.003 and 0.015 or less. When emphasizing the front brightness and view angle, the difference between the refractive indexes $N_p$ and $N_b$ is preferably large within the above-specified range; while, when lowering black brightness and emphasizing the contrast, the difference between these refractive indexes is preferably small. The term "black brightness" means brightness of the black part which shows minimum brightness.

Although the relation: $N_p > N_b$ is preferable in this embodiment, the relation between $N_p$ and $N_b$ is not limited to it. It is possible to form the light-absorbing portions 14 so that refractive index of the light-transmissive portion and that of the light-absorbing portion are the same or refractive index of the light-transmissive portion is smaller than that of the light-absorbing portion.

In addition, the light-absorbing portion 14 of the embodiment is formed by filling the portion between the light-transmissive portions 13 with a composition for constituting the light-absorbing portion, which includes: light-absorbing particles 16; and a binder 15. In other words, the light-absorbing particles 16 are dispersed in the binder 15. By the structure, in the light-absorbing portion 14, the image light entered into the light-absorbing portion 14 can be absorbed at the light-absorbing particles 16 without causing reflection based on Snell's law at the interface between the light-transmissive portion 13 and the light-absorbing portion 14. Moreover, the light-absorbing particles 16 can adequately absorb the external light incoming at a certain angle from the observer side, which results in improvement of the contrast.

In this case, the binder 15 is formed by a material having refractive index $N_b$. The material to be used as the binder is not particularly limited; for instance, a light curable resin composition in which a light curable prepolymer (P2), a reactive diluent monomer (M2), and a photopolymerization initiator (I2) are mixed is preferably used.

Examples of light curable prepolymer (P2) include: urethane (meth)acrylate, polyester (meth)acrylate, epoxy (meth)acrylate, and butadiene (meth)acrylate.

Examples of the reactive diluent monomer (M2) as monofunctional monomer include: vinyl monomers such as N-vinylpyrrolidone, N-vinylcaprolactone, vinyl imidazole, vinylpyridine, and styrene; monomers of (meth)acrylic acid ester and (meth)acrylamide derivatives such as lauryl (meth)acrylate, stearyl (meth)acrylate, butoxyethyl (meth)acrylate, ethoxy diethylene glycol (meth)acrylate, methoxy triethylene glycol (meth)acrylate, methoxy polyethylene glycol (meth)acrylate, methoxy dipropylene glycol (meth)acrylate, para-cumyl phenoxyethyl (meth)acrylate, nonylphenoxy polyethylene glycol (meth)acrylate, tetrahydrofurfuryl (meth)acrylate, isobornyl (meth)acrylate, cyclohexyl (meth)acrylate, benzylmethacrylate, N,N-dimethyl(meth)acrylamide, N,N-dimethylaminopropyl (meth)acrylate, and acryloylmorpholine. Examples of the reactive diluent monomer (M2) as multifunctional monomer include: ethylene glycol di(meth)acrylate, diethylene glycol di(meth)acrylate, triethylene glycol di(meth)acrylate, polyethylene glycol di(meth)acrylate, tripropylene glycol di(meth)acrylate, polytetramethylene glycol di(meth)acrylate, 1,4-butanediol di(meth)acrylate, 1,6-hexanediol di(meth)acrylate, 1,9-nonanediol di(meth)acrylate, 3-methyl-1,5-pentanediol di(meth)acrylate, neopentyl glycol di(meth)acrylate, dimethyloltricyclodecane di(meth)acrylate, hydroxy pivalic acid neopentyl glycol di(meth)acrylate, bisphenol A polypropoxydiol di(meth)acrylate, trimethylolpropane tri(meth)acrylate, ethoxylated trimethylolpropane tri(meth)acrylate, propoxylated trimethylolpropane tri(meth)acrylate, pentaerythritol tri(meth)acrylate, glyceryl tri(meth)acrylate, propoxylated glyceryl tri(meth)acrylate, tris(2-hydroxyethyl) isocyanurate triacrylate, pentaerythritol tetra(meth)acrylate, ditrimethylolpropane tetra(meth)acrylate, dipentaerythritol penta(meth)acrylate, and dipentaerythritol hexa(meth)acrylate.

Examples of the photopolymerization initiator (I2) include: 1-hydroxycyclohexyl phenyl ketone, 2-hydroxy-2-methyl-1-phenylpropane-1-one, 2,2-dimethoxy-1,2-diphenylethane-1-one, 2,4,6-trimethylbenzoyldiphenylphosphine oxide, and bis(2,4,6-trimethylbenzoyl)phenylphosphine oxide. Among them, the photopolymerization initiator (I2) can be arbitrarily selected depending on the irradiation apparatus for curing light curable resin composition and curing property of the light curable resin composition. In the present invention, in view of curing property and cost of the light curable resin composition, the amount of photopolymerization initiator (I2) contained in the light curable resin composition based on a total amount of the light curable resin composition (100 mass %) is preferably 0.5-10.0 mass %.

The light curable prepolymer (P2), the reactive diluent monomer (M2), and the photopolymerization initiator (I2) to be used may respectively be single species or a combination of two or more species thereof.

More specifically, the photopolymerizable component (specifically, the light curable prepolymer and the reactive diluent monomer) consisting of urethane acrylate, epoxy acrylate, tripropylene glycol diacrylate, and methoxy triethylene glycol acrylate can be arbitrarily mixed in view of refractive index, viscosity, effect on the property of the optical functional sheet layer 12, and so on.

Moreover, as required, additives such as silicone, antifoaming agent, leveling agent, and solvent may be added to the composition for constituting the light-absorbing portion.

The light-absorbing particles 16 is included in the composition for constituting the light-absorbing portion and acts as the stray light and external light absorber after the light-absorbing portion 14 is formed.

As the light-absorbing particles 16, light-absorbing colored particles such as carbon black are preferably used. However, the light-absorbing particle 16 is not limited to it; colored particles which can selectively absorb a light having a certain wavelength can be used as the light-absorbing particle 16 depending on the properties of the image light. More specifically, for example, colored glass beads or organic particulates colored by carbon black, graphite, metal salt such as black iron oxide, dye, and pigment, may be used. Particularly, in view of cost, quality, and availability, the colored organic particulates are preferably used. More specifically, for example, acrylic cross-linked particulate containing carbon black and urethane cross-linked particulate containing carbon black are preferably used. Such colored particles are usually contained in the composition for constituting the light-absorbing portion within the range of 3-30 mass %. The average diameter of the colored particles is preferably 1.0 µm or more and 20 µm or less. The term "the average diameter (of the particles)" means a diameter which can be obtained by particle size measurement in accordance with mass distribution measurement. By using the colored particles having average diameter of 1.0 µm or more, it is possible to prevent the colored particles from not being strickled by a doctor blade and thus remaining on the upper base of the light-transmissive portions when forming the light-absorbing portions 14, 14, . . . in accordance with the below-described method.

The light absorbing means is not limited to the method by using the light-absorbing particles of this embodiment. For example, the light absorbing means may be a method by coloring the entire composition for constituting the light-absorbing portion by pigment or dye and forming an entirely-colored light-absorbing portion.

The light-absorbing portion 14 can be formed by using the above-described composition for constituting the light-absorbing portion in accordance with the below-described method.

Figure 5:
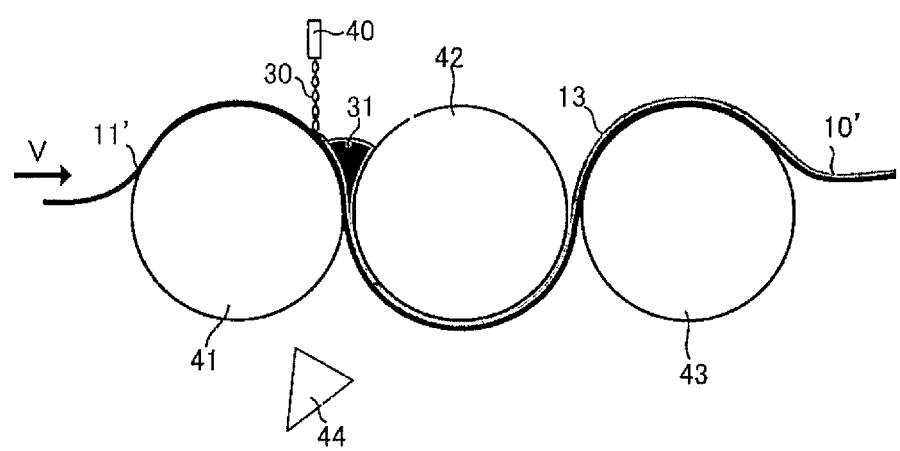
FIG. 5 is a schematic view showing a part of process regarding an example of producing method of the optical functional layer.
Figure 6:
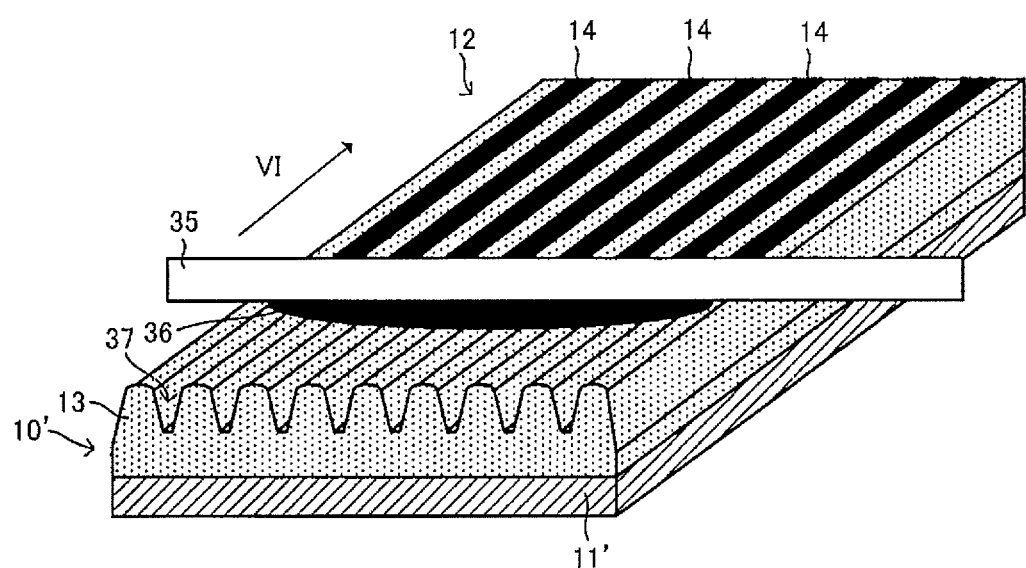
FIG. 6 is a schematic view showing a part of process regarding another example of producing method of the optical functional layer.

Next, the method for producing the optical functional layer 12 will be described. FIG. 5 is a schematic view showing apart of process of an example of producing method of the optical functional layer 12. FIG. 6 is a schematic view showing a part of process of another example of producing method of the optical functional layer.

When producing the optical sheet 10, as shown in FIG. 5, a light-transmissive portion 13 is formed on a base material 11' including the base material layer 11 to obtain a sheet 10'. To form the light-transmissive portion 13, a die roll 42 having certain pitch grooves corresponding to the shape of the light-transmissive portion 13 is prepared. Then, the base material 11' is fed between the die roll 42 and a nip roll 41. The arrow V shown in FIG. 5 indicates the direction to feed the base material 11'. With feeding the base material 11', droplet of the composition for constituting the light-transmissive portion 30 is continuously supplied between the die roll 42 and the base material 11' from a feeder 40. When supplying the composition for constituting the light-transmissive portion 30 from the feeder 40 on the base material 11', a reservoir 31 of the composition for constituting the light-transmissive portion 30 should be formed between the die roll 42 and the base material 11'. In the reservoir 31, the composition for constituting the light-transmissive portion 30 spread on the base material 11' along the width direction.

The composition for constituting the light-transmissive portion 30, thus supplied between the die roll 42 and the base material 11', is filled between the base material 11' and the die roll 42 by the pressure of the die roll 42 and the nip roll 41. Thereafter, by irradiating light to the composition for constituting the light-transmissive portion by using a light irradiation unit 44 to cure the composition for constituting the light-transmissive portion, the light-transmissive portion 13 can be formed. After forming the light-transmissive portion 13, the sheet 10' in which the light-transmissive portion 13 is formed on the sheet 11' is separated from the die roll 42 by being drawn through a mold-releasing nip roll 43.

Then, as shown in FIG. 6, the optical functional layer 12 is obtained by forming the light-absorbing portions 14 between the light-transmissive portions 13 of the sheet 10'. More specifically, firstly, the composition for constituting the light-absorbing portion 36 is supplied on the light-transmissive portion 13; then, by using a doctor blade 35, the composition for constituting the light-absorbing portion 36 is filled in the grooves 37 between the light-transmissive portions 13. After that, the excessive amount of the composition for constituting the light-absorbing portion 36 is strickled and the light is irradiated to the composition for constituting the light-absorbing portion 36 remaining in the grooves 37 between the light-transmissive portions 13 to cure the composition. Accordingly, the light-absorbing portion 14 can be formed. The arrow VI shown in FIG. 6 indicates the transferring direction of sheet 10'.

At the phase, the elastic modulus of the light-transmissive portion 13 is preferably 10 MPa or more and below 2000 MPa. If the elastic modulus of the light-transmissive portion 13 is 2000 MPa or more, the light-transmissive portion is hardened and tends to cause crack and chip, the optical functional layer 12 shows poor appearance when forming the light-absorbing portion 14 in the above-described method, and transmissivity of the optical functional layer 12 tends to decrease. The reason for the decrease of transmissivity is assumed that if the light-transmissive portion 13 is too hard, when strickling the excessive amount of the composition for constituting the light-absorbing portion 36 supplied on the light-transmissive portion 13 by pressing the doctor blade 35 against the light-transmissive portion 13, it is hard to deform the light-transmissive portion 13; thereby the excessive amount of the composition for constituting the light-absorbing portion 36 cannot be fully strickled. By setting the elastic modulus of the light-transmissive portion 13 within the above-specified range, when pressing the doctor blade 35, the excessive amount of composition for constituting the light-absorbing portion 36 can be fully strickled because the light-transmissive portion 13 deforms enough; thereby it is possible to prevent causing of poor appearance of the optical functional layer 12 and possible to prevent decreasing transmissivity of the optical functional layer 12. If the elastic modulus of the light-transmissive portion 13 is 10 MPa or less, the light-transmissive portion 13 is too soft to separate from the die roll 42 in the process shown in FIG. 5.

In the above-described optical functional layer 12, the recess portion produced in the light-absorbing portion is formed by a binder monolayer; however, in view of adjusting the depth of the recess portion, a covering layer may be formed on the binder by laminating the composition. The refractive index of the covering layer can also be adequately adjusted. For example, if the refractive index of the covering layer is set to the same value as that of the adhesive layer, light refracts at an interface between the covering layer and the binder. If the refractive index of the covering layer is set to the same value as that of the binder, light refracts at an interface between the adhesive layer and the binder layer. By using the covering layer, the depth of the recess position produced in the light-absorbing portion can be adjusted. As the result, it is possible to adjust refraction of light and possible to produce the optical sheet easily.

The adhesive layer 20 will be described with reference to FIG. 2. The adhesive layer 20 is a layer made of an adhesive composition containing an adhesive. As the adhesive, a conventional one which exhibits required optical transparency, adherence, and weather ability can be used. The adhesive composition may contain, for instance, ultraviolet absorber, near-infrared absorber, neon absorber, and toning color.

The term "adhesive" means a kind of adhesive agent that is adherable with the adherence of its surface by only an adequate pressure (usually at a degree lightly pressed by hand). To attain the adherence of the adhesive, usually, physical energy and actions such as heating, humidification, delivery of radiation (e.g. ultraviolet ray, electron beam) is not particularly required; chemical reaction such as polymerization reaction is not required either. Moreover, the adhesive is the one which can maintain the removable low-tack adhesive force over time after the adhesion.

The thickness of the adhesive layer 20 is preferably 20 μm or more and 50 μm or less. The thickness of the adhesive layer 20 means the thickness of the thickest part of the adhesive layer 20. If the adhesive layer 20 is thinner than 20 μm, the following capability to the recess and the protrusion declines, which causes problems of bubble inclusion; if the adhesive layer 20 is thicker than 50 μm, it is difficult to uniformly adhere the adhesive composition.

In addition, the storage elastic modulus of the adhesive of the adhesive layer 20 is preferably 0.1 MPa or more and 0.8 MPa or less. If the storage elastic modulus is more than 0.8 MPa, the following capability to the recess and protrusion declines, which causes problems of bubble inclusion; if the storage elastic modulus is less than 0.1 MPa, the adhesive composition is so soft that it may protrude outside the laminated layers resulting in the formation of the fouling, which may cause inconvenience.

In view of enhancing adhesiveness to both the below-described electromagnetic wave shielding layer 21 and the above-described optical functional layer 12, the adhesive layer 20 preferably comprises an adhesive having acid number. Examples of adhesive having acid number include: natural rubber or synthetic resin having acid number, and one comprising substance of which molecule has carboxyl group(s). More specifically, in view of high transparency, the adhesive having acid number is preferably an acrylic adhesive. Moreover, in view of improving adhesiveness to both the electromagnetic wave shielding layer 21 and the optical functional layer 12, the acid number of the acrylic adhesive is preferably one or more.

As the acrylic adhesive having acid number included in the adhesive layer 20, an adhesive, which exhibits adequate adhesive force, transparency, and applicability and which does not substantially change the transmission spectrum of the optical sheet of the present invention, is properly selected among the conventionally used adhesives.

The acrylic adhesive having acid number is produced by polymerization including at least an alkyl (meth)alkyl acrylate ester monomer; it is generally a copolymer of an alkyl (meth)alkyl acrylate ester monomer having about $C_1$-$C_{18}$ alkyl group and a monomer having carboxyl group. The adhesive performance of the adhesive contained in the adhesive layer 20 can be attained in a manner that carboxyl group existing in the adhesive molecule strongly adsorbs the surface of a copper mesh layer of the electromagnetic wave shielding layer 21.

Examples of the alkyl (meth)acrylate ester monomer include: methyl (meth)acrylate, ethyl (meth)acrylate, n-propyl (meth)acrylate, sec-propyl (meth)acrylate, n-butyl (meth)acrylate, sec-butyl (meth)acrylate, tert-butyl (meth)acrylate, isoamyl (meth)acrylate, n-hexyl (meth)acrylate, cyclohexyl (meth)acrylate, n-octyl (meth)acrylate, isooctyl (meth)acrylate, 2-ethylhexyl (meth)acrylate, undecyl (meth) acrylate, and lauryl (meth)acrylate. Among them, butyl acrylate and 2-ethylhexyl acrylate are preferable; a combination of butyl acrylate and 2-ethylhexyl acrylate is preferably used.

The alkyl (meth)acrylate ester is usually copolymerized in the acrylic adhesive at a ratio of 30.0-99.5 parts by mass.

Moreover, examples of the monomer having carboxyl group for forming the acrylic adhesive may include: a monomer containing carboxyl group such as (meth)acrylic acid, itaconic acid, crotonic acid, maleic acid, monobutyl maleate, and β-carboxyethyl acrylate.

Further, as the acrylic adhesive, other than the above examples, monomers containing other functional groups may be copolymerized within the range which does not undermine the property of the acrylic adhesive. Examples of the monomer having other functional groups include: hydroxyl-group-containing monomers such as 2-hydroxyethyl (meth)acrylate, 2-hydroxypropyl (meth)acrylate, and allyl alcohol; amide-group-containing monomers such as (meth)acrylamide, N-methyl (meth)acrylamide, and N-ethyl (meth)acrylamide; monomers containing both amide group and methylol group such as N-methylol(meth)acrylamide and dimethylol (meth)acrylamide; amino-group-containing monomers such as aminomethyl (meth)acrylate and dimethyl aminoethyl (meth)acrylate; and epoxy-group-containing monomers such as allyl glycidyl ether and (meth)acrylic acid glycidyl ether. In addition, not only fluorine-substituted (meth)alkyl acrylate ester and (meth)acrylonitrile, but also vinyl-group-containing aromatic compounds such as styrene, methylstyrene, vinyl pyridine, and vinyl acetate as well as halogenated vinyl compounds can be exemplified.

Still further, as the acrylic adhesive, other than the above-described monomers having other functional groups, other monomers having ethylene-based double bond can be used. Examples of monomer having ethylene-based double bond include: diester of α,β-unsaturated dibasic acid such as dibutyl maleate, dioctyl maleate, and dibutyl fumarate; vinyl ester such as vinyl propionate; vinyl ether; and vinyl aromatic compound such as vinyl toluene.

Together with the monomers having ethylene-based double bond, a compound having two or more ethylene-based double bond can be used. Examples of such compounds include: divinylbenzene, diallyl maleate, diallyl phthalate, ethylene glycol di(meth)acrylate, trimethylolpropane tri(meth)acrylate, and methylene bis(meth)acrylamide.

Still further, other than the above monomers, monomers having alkoxyalkyl chane can be used. Examples of alkoxyalkyl (meth)acrylate ester include: 2-emthoxyethyl (meth)acrylate, methoxyethyl (meth)acrylate, 2-methoxypropyl (meth)acrylate, 3-methoxypropyl (meth)acrylate, 2-methoxybutyl (meth)acrylate, 4-methoxybutyl (meth)acrylate, 2-ethoxyethyl (meth)acrylate, 3-ethoxypropyl (meth)acrylate, and 4-ethoxybutyl (meth)acrylate.

As the commercially available acrylic adhesives, for example, a commodity name "5407" manufactured by The Nippon Synthetic Chemical Industry Co, Ltd. is suitably used.

The adhesive layer 20 may contain an antioxidant. By using the adhesive layer containing an antioxidant, it is possible to prevent discoloration of the electromagnetic wave shielding layer 21 while using the adhesive having acid number for attaining favorable adhesiveness. The compounds to be used as the antioxidant may be selected from the group consisting of: benzotriazole-based antioxidant, phenol-based antioxidant, phosphite-based antioxidant, amine-based antioxidant, and sulfur-containing organic metal salt-based antioxidant. Among them, in view of preventing discoloration of the copper mesh layer of the electromagnetic wave shielding layer 21 into blue, the antioxidant contained in the adhesive layer 20 is preferably benzotriazole-based antioxidant.

Examples of the benzotriazole-based antioxidant may be a compound characterized by including at least the structure of the following Formula (1) as the skeleton, as well as the sodium salt, calcium salt, and amine salt thereof. Examples of substituents which may be included in the formula (1) include: an alkyl group which may include substituent(s), an aryl group which may include substituent(s), and a halogen atom.

(Formula 1)

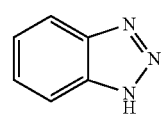

(1)

More specific examples include: 1,2,3-benzotriazole (i.e. 1H-benzotriazole), 1H-benzotriazole sodium salt, 4-methyl-1H-benzotriazole, 5-methyl-1H-benzotriazole, 4-methyl-1H-benzotriazole potassium salt, 5-methyl-1H-benzotriazole potassium salt, 4-methyl-1H-benzotriazole amine salt, 5-methyl-1H-benzotriazole amine salt, 2-(3,5-di-t-butyl-2-hydroxyphenyl)-5-chlorobenzotriazole, and 2-(3,5-di-t-amyl-2-hydroxyphenyl)benzotriazole. Among them, 1,2,3-benzotriazole (i.e. 1H-benzotriazole) is preferable.

In the adhesive layer 20, to obtain sufficient adhesive force of the adhesive layer 20 and not to cause surface discoloration of the copper mesh layer of the electromagnetic wave shielding layer 21, one or more parts by mass of the above benzotriazole-based antioxidant may be preferably contained based on 100 parts by mass of the above adhesive. If the content of the antioxidant is below the above-described range, even when the antioxidant is contained in the adhesive layer 20, discoloration of the copper mesh layer of the electromagnetic wave shielding layer 21 may not be sufficiently prevented.

It is more preferable that the adhesive layer 20 contains an adhesive of which acid number is 1 or more and 1 or more parts by mass of the benzotriazole-based antioxidant based on 100 parts by mass of the adhesive.

In addition, as required, curing agent (crosslinking agent) based on e.g. isocyanate compounds, tackifier, silane coupling agent, and filler may be added to the adhesive layer.

The electromagnetic wave shielding layer 21 will be described with reference to FIG. 2. As the name indicates the function, the electromagnetic wave shielding layer 21 is a layer which can shield electromagnetic wave. As long as the layer has the function, the electromagnetic wave shielding means is not particularly limited. The electromagnetic wave shielding layer may be the copper mesh layer formed on a transparent base material by etching, printing, vapor deposition, or sputtering; the electromagnetic wave shielding layer is adequately designed depending on the type of electromagnetic wave to be shield. when the method, in which the mesh is formed by photolithography process of a metal foil after laminating the transparent base material and the metal foil with an adhesive, is selected as the method of forming the copper mesh layer (for example, Japanese Patent Application Laid-open No. 11-145678), it is possible to prevent discoloration of the electromagnetic wave shielding layer 21 by adding the above antioxidant even to the adhesive.

Next, the wavelength filter layer 22 will be described. The wavelength filter layer 22 is a layer for controlling transmission of light having a certain wavelength. As required, the wavelength of the light to be controlled can be properly selected. Specific examples of the layer may be: a layer which cuts neon line emitted from PDP or cuts infrared ray, near-infrared light, and ultraviolet ray; and a tone-adjusting layer. Hereinafter, a near-infrared light shielding layer (near-infrared light absorbing filter), a neon line shielding layer (neon line absorbing filter), a tone adjusting layer (tone adjusting filter), and a ultraviolet shielding layer (ultraviolet absorbing filter) will be described.

Examples of the near-infrared light absorbing filter include: a commercially available film containing a near-infrared light absorbent (e.g. commodity name "2832" manufactured by Toyobo Co., Ltd.); a film obtained by film forming of a composition of which adhesive layer or resin layer contains a near-infrared light absorbing pigment; and a film obtained by applying the above composition to a transparent base material or other functional filter and then, as required, for example, by drying and hardening the composition.

Examples of near-infrared light-absorbing pigment may be the one which absorbs light having a wavelength range of near-infrared light region generated by discharge of xenon gas emitted by PDP, namely, the eavelength range of 800-1100 nm. The transmissivity of the near-infrared light in the band is preferably 20% or less, more preferably 10% or less. At the same time, the near-infrared light absorbing filter preferably exhibits sufficient transmissivity in the visible light range, i.e. in the wavelength range of 380-780 nm.

Specific examples of the near-infrared light absorbing pigment include: organig-based near-infrared light absorbing pigments of, such as, polymethine-based compound, cyanine-based compound, phthalocyanine-based compound, naphthalocyanine-based compound, naphthoquinone-based compound, anthraquinone-based compound, dithol-based compound, immonium-based compound, diimmonium-based compound, aminium-based compound, pyrylium-based compound, cerylium-based compound, squarylium-based compound, copper complexes, nickel complexes, and dithol-based metal complexes; and inorganic-based near-infrared ray absorbing pigments of, such as, tungsten oxide, tin oxide, indium oxide, magnesium oxide, titanium oxide, chromium oxide, zirconium oxide, nickel oxide, aluminum oxide, zinc oxide, iron oxide, ammonium oxide, lead oxide, bismuth oxide, and lanthanum oxide. These may be used alone or used in combination of two or more thereof.

Examples of binder resin for dispersing the near-infrared ray absorbing pigment may be a resin such as polyester resin, polyurethane resin, acrylic resin, and epoxy resin. Examples of drying and curing method of the binder resin may be: a drying-solidifying method by evaporating solvent (or dispersion media) from the solution (or emulsion); a curing method employing polymerization and/or cross-linking reaction by energy such as heat, ultraviolet rays, and electron beam; or other curing methods employing polymerization and/or cross-linking reaction of functional group in the resin (e.g. hydroxyl group and epoxy group) with, for example, an isocyanate group in the curing agent.

The neon line absorbing filter is provided so as to absorb neon light (namely, emission spectrum of neon atom) radiated from the PDP when the optical filter is used for the plasma display. The emission spectal range of neon light is in a wavelength range of 550-640 nm, so the neon line absorbing filter is preferably designed so that the spectral transmissivity is 50% or less in the wavelength of 550-640 nm. The neon absorbing filter may be: a membrane made of a composition in which a conventionally used dye having an absorption maximum in a wavelength range of at least 550-640 nm is dispersed in a binder resin exemplified in the description of the near-infrared light absorbing filter; or a film obtained by applying the composition on a transparent base material or other functional filter and then, as required, for example, by drying and curing the applied composition. Specific examples of the neon line absorbing dye include: cyanine-based, oxonol-based, methine-based, subphthalocyanine-based, and porphyrin-based compounds. The binder resin may be the one exemplified in the description about the near-infrared ray absorbing dye.

The filter for adjusting color tone is the one to adjust color of the filter for display so as to improve purity and color reproduction range of the light emitted from the panel as well as to improve color of display in the off state. Examples of the color-tone adjusting filter may be: a membrane made of a composition in which a color-tone adjusting dye is dispersed in a resin; or a film obtained by applying the composition on a transparent base material or other functional filter and then, as required, for example, by drying and curing the applied composition. As the color-tone adjusting dye, among known dyes each having wavelength of maximum absorption in a visible light range of 380-780 nm, the dyes can be used in arbitrary combination depending on the intended purpose. Examples of the known dye usable as the color-tone adjusting dye include: dyes disclosed in Japanese Patent Application Laid-Open (JP-A) No. 2000-275432, JP-A No. 2001-188121, JP-A No. 2001-350013, and JP-A No. 2002-131530. In addition, dyes (which absorb visible light such as yellow light, red light and blue light) such as anthraquinone-based, naphthalene-based, azo-based, phthalocyanine-based, pyrromethene-based, tetraazaporphyrin-based, squarylium-based, and cyanine-based dyes can be used as the color-tone adjusting dye. The binder resin may be the one exemplified in the description of the above-described near-infrared light absorbing filter.

Examples of ultraviolet absorbing filter may be: a membrane made of a composition in which a ultraviolet absorber is dispersed in a binder resin; or a film obtained by applying the composition on a transparent base material or other functional filter and then, as required, for example, by drying and curing the applied composition. Examples of the ultraviolet absorber include: an organic compound such as benzotriazole and benzophenone; and an inorganic compound such as microparticulated zinc oxide and cerium oxide. The binder resin may be the one exemplified in the description of the above-described near-infrared light absorbing filter.

Next, the antireflection layer 23 will be described. The antireflection layer 23 is disposed at the most observer side of the optical sheet and a layer having a function for preventing reflection of the external light. By the antireflection layer 23, it is possible to inhibit the reflection of the external light at the surface of the observer side of the optical sheet and to inhibit the returning of the reflected light to the observer side, that is to say, it is possible to reduce the reflected glare. Such an antireflection layer 23 can be formed, for example, by using a commercially available antireflection film.

As above, the base material layer 11, the optical functional layer 12, the adhesive layer 20, the electromagnetic wave shielding layer 21, the wavelength filter layer 22, and the antireflection layer 23 have been described based on the embodiment. However, the present invention can be formed by including at least the base material layer 11 and the optical functional layer 12; depending on the intended purpose, layers other than the above-described layers having various functions can be provided. More specifically, the invention can be formed by adhering, for example, an anti-glare layer and a hard coating layer with an adhesive layer to the unit including the base material layer 11 and the optical functional layer 12. If the adhesive consists ultraviolet absorber, near-infrared light absorber, neon line absorber, toning color, and so on, the adhesive layer can be used also as a wavelength filter layer. Order for laminating these layers and the number of the layers are properly determined depending on the intended purpose of the optical sheet. Hereinafter, the anti-glare layer and the hard coating layer will be described.

The anti-glare layer is a layer to inhibit glare; it is also called AG layer. As the anti-glare layer, commercially available one can be used.

The hard coating layer is also called HC layer. The hard coating layer is a layer made of a film which exhibits abrasion-resistant to protect the image display face from scratching.

In the plasma television 1, the layer structure of the optical sheet 10 may be modified and the adhesive layer 20 may be directly adhered to the PDP 5. As the adhesive layer 20 is disposed, even when the optical sheet 10 is directly adhered to the PDP 5, the protrusion 17 will not be deformed.

Hereinafter, the optical path of the image light passing through the optical functional layer 12 in the image display unit 1 will be described. As described above, the optical functional layer 12 comprises: the light-transmissive portions 13 respectively having the protrusion 17 at the image light source 5 side thereof; and the light-absorbing portions 14 respectively having the recess portion 18 at the image light source 5 side thereof. By the optical functional layer 12 having the above structure, the image source unit 4 and the image display unit 1 using the image source unit 4 can improve use efficiency of the image light.

Figure 7:
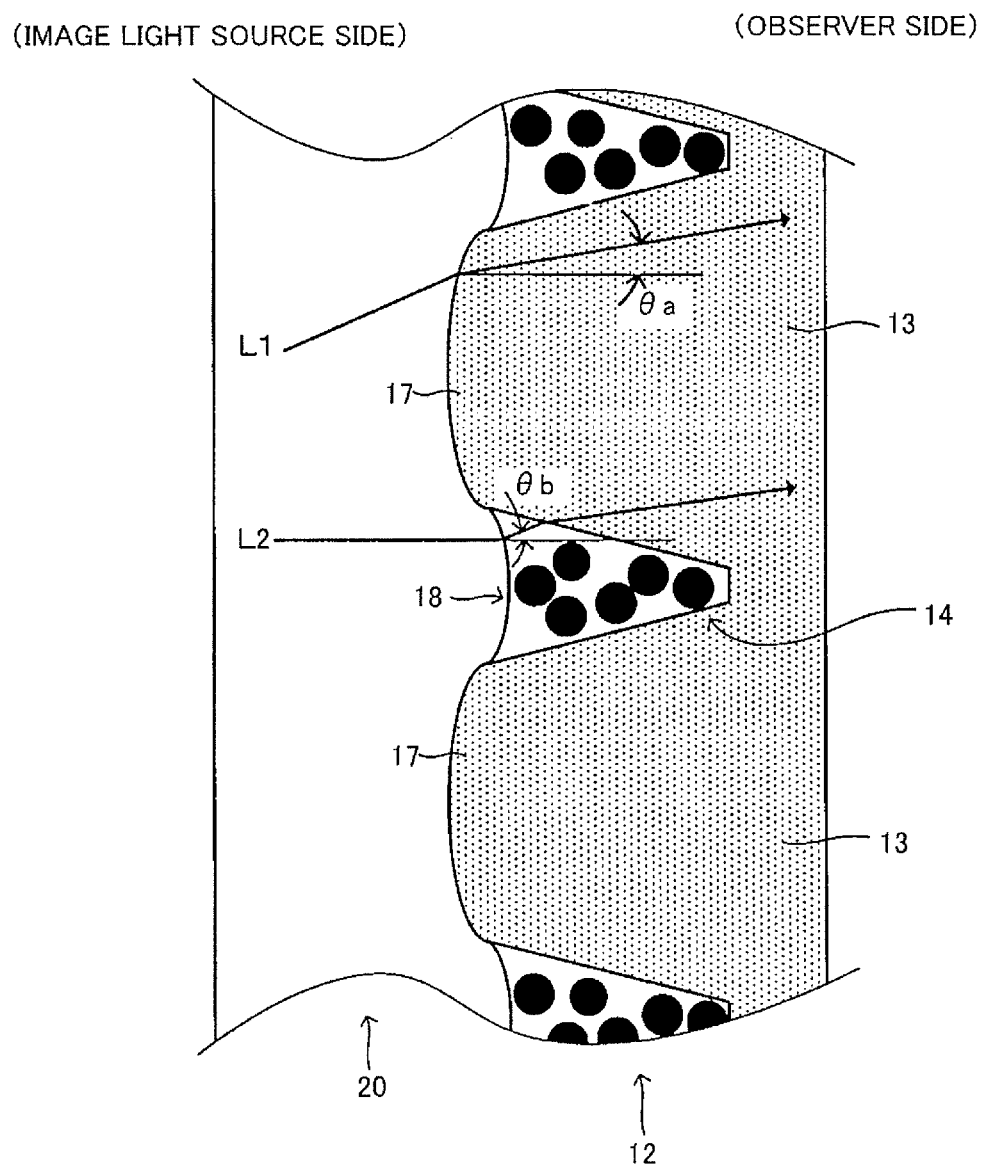
FIG. 7 is a schematic view showing an example of optical path of an image light passing through the optical functional layer.

The mechanism how the optical sheet 10 can improve use efficiency of the image light will be described with reference to FIG. 8. FIG. 7 is a schematic view showing examples of optical path of an image light passing through the optical functional layer 12. It should be noted that, to help understanding of the optical path, FIG. 7 and the below-indicated drawings which describe the optical path exaggerate the refracting angle.

As shown in FIG. 7, the image light L1 incoming into the light-transmissive portion 13 at a certain angle firstly enters the protrusion 17 and is refracted. The obliquity angle θa of the image light L1 entered from the protrusion 17 into the light-transmissive portion 13 with respect to the normal line of the sheet face is relatively smaller than when the protrusion 17 is not provided, namely, when the upper base and the lower base of the light-transmissive portion are formed parallel. Hence, the image light which enters the protrusion 17 is refracted in a converging direction. A part of the image light entered into the light-transmissive portion 13 is absorbed by entering into the light-absorbing portion from the oblique line of the light-absorbing portion 14; however, as described above, by refracting the image light entered into the light-transmissive portion 13 to the converging direction, it is possible to reduce the image light being absorbed in the light-absorbing portion 14. In other words, by converging the image light at the protrusion 17, a part of the image light which hits the oblique line of the light-absorbing portion 14 when the protrusion 17 is not provided does not hit the oblique line of the light-absorbing portion 14 anymore. In addition, image light having a total-reflection angle when it hits the oblique line of the light-absorbing portion 14 increases; such image light will not be absorbed at the light-absorbing portion 14. In this way, the image light, which is not absorbed at the light-absorbing portion 14 anymore, is outputted from the base material layer 11 side face of the optical functional layer 12 to the observer side.

On the other hand, the image light L2 incoming into the light-absorbing portion 14 at a certain angle firstly enters from the recess portion 18 into the light-absorbing portion 14 and is refracted. The obliquity angle θb of the image light L2 entered from the recess portion 18 into the light-absorbing portion 14 with respect to the normal line of the sheet face is relatively larger than when the recess portion 18 is not provided, namely, when the base of the light-absorbing portion is formed in parallel with the face of the base material layer 11. Hence, the image light entered from the recess portion 18 into the light-absorbing portion 14 is refracted in the diffusion direction. A part of the image light entered into the light-absorbing portion 14 is absorbed at the light-absorbing particles 16 of the light-absorbing portion 14; however, as described above, by refracting the image light entered into the light-absorbing portion 14 to the diffusion direction, it is possible to transmit the image light from the oblique line of the light-absorbing portion 14 to the light-transmissive portion 13 and possible to reduce the image light to be absorbed in the light-absorbing portion 14. In other words, by the image light is diffused at the recess portion 18, a part of the image light, which has been absorbed at the light-absorbing portion 14 in a case where the recess portion 18 is not provided, is not absorbed at the light-absorbing portion 14 but outputted from the base material layer 11 side of the optical functional layer 12 to the observer side through the light-transmissive portion 13.

As seen above, according to the optical functional layer 12, by the light-transmissive portion 13 having the protrusion 17, it is possible to reduce the image light absorbed at the light-absorbing portion 14, thereby it is possible to improve use efficiency of the image light. Moreover, by the light-absorbing portion 14 having the recess portion 18, it is possible to further reduce the image light absorbed at the light-absorbing portion 14, thereby the use efficiency of the image light can be improved.

In view of converging the image light more at the protrusion 17, the refractive index $N_p$ of the light-transmissive portion 13 is preferably higher than the refractive index $N_n$ of the adhesive layer 20; and the difference between the refractive index $N_p$ and the refractive index $N_n$ is preferably larger than 0.05. In addition, in view of diffusing the image light more at the recess portion 18, the refractive index $N_b$ of the light-absorbing portion 14 is preferably higher than the refractive index $N_n$ of the adhesive layer 20; the difference between the refractive index $N_b$ and the refractive index $N_n$ is preferably larger than 0.05.

Further, as above, according to the optical functional layer 12, since use efficiency of the image light can be improved in the direction of view angle expansion, by deepening the light-absorbing portion 14 (i.e. by thickening in the thickness direction of the optical functional layer 12) in response to the degree of the view angle expansion, it is possible to improve contrast while maintaining the view angle. Still further, when using total reflection (caused by the refractive index difference between the light-transmissive portion 13 and the light-absorbing portion 14) at the interface between the light-transmissive portion 13 and the light-absorbing portion 14, since the fully-reflected light is diffused by the protrusion 17 of the light-transmissive portion 13, it is possible to improve view angle property and color unevenness caused by wavelength dispersion of the total reflection.

Accordingly, the image source unit and the image display unit using the image source unit of the embodiment can improve use efficiency of the image light.

Figure 8:
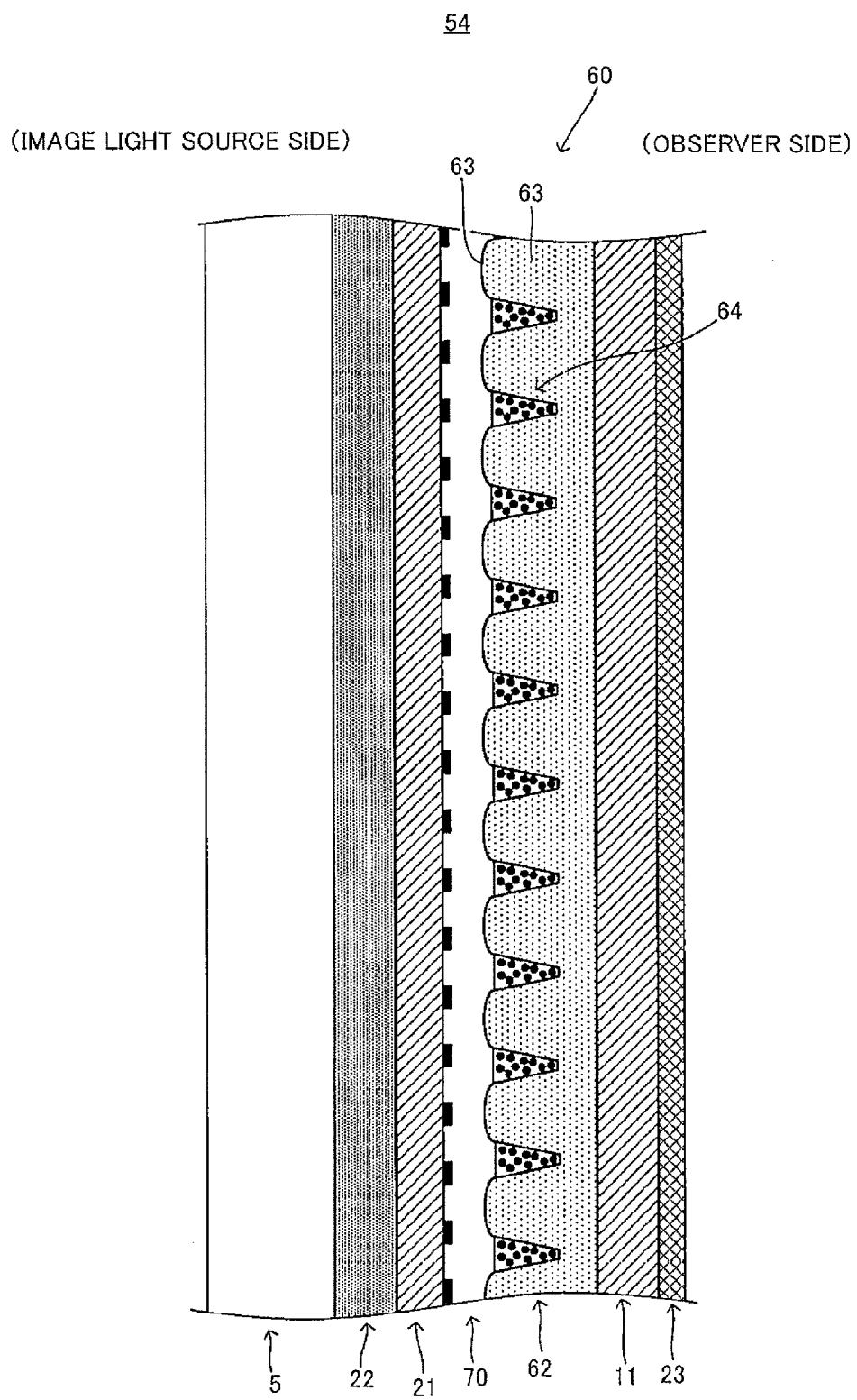
FIG. 8 is a schematic view showing a part of cross section of the image source unit according to the second embodiment.

FIG. 8 is a schematic view showing a cross section of the image source unit 54 of the second embodiment and the layer structure. The image source unit 54 comprises: a plasma display panel 5 (PDP 5) as an image light source 5; and an optical sheet 60. The optical sheet 60 is a sheet-type member to control the light incoming from the image light source 5 side and output the light to the observer side and is disposed at the image outgoing side of the image light source 5.

Plasma display panel may be a conventional one.

The optical sheet 60 has a plurality of layers; as shown in FIG. 8, it at least comprises: the base material layer 11; and an optical functional layer 62 formed on the image light source 5 side face of the base material layer 11. The optical sheet 60 shown in FIG. 8 also comprises an adhesive layer 70, the electromagnetic wave shielding layer 21, the wavelength filter layer 22, and the antireflection layer 23.

In the optical sheet 60, the base material layer 11, the electromagnetic wave shielding layer 21, the wavelength filter layer 22, and the antireflection layer 23 are in common with those of the optical sheet 10, so the descriptions are omitted. In addition, in the optical sheet 60, in the same manner as the optical sheet 10, other functional layers can be laminated.

Figure 9:
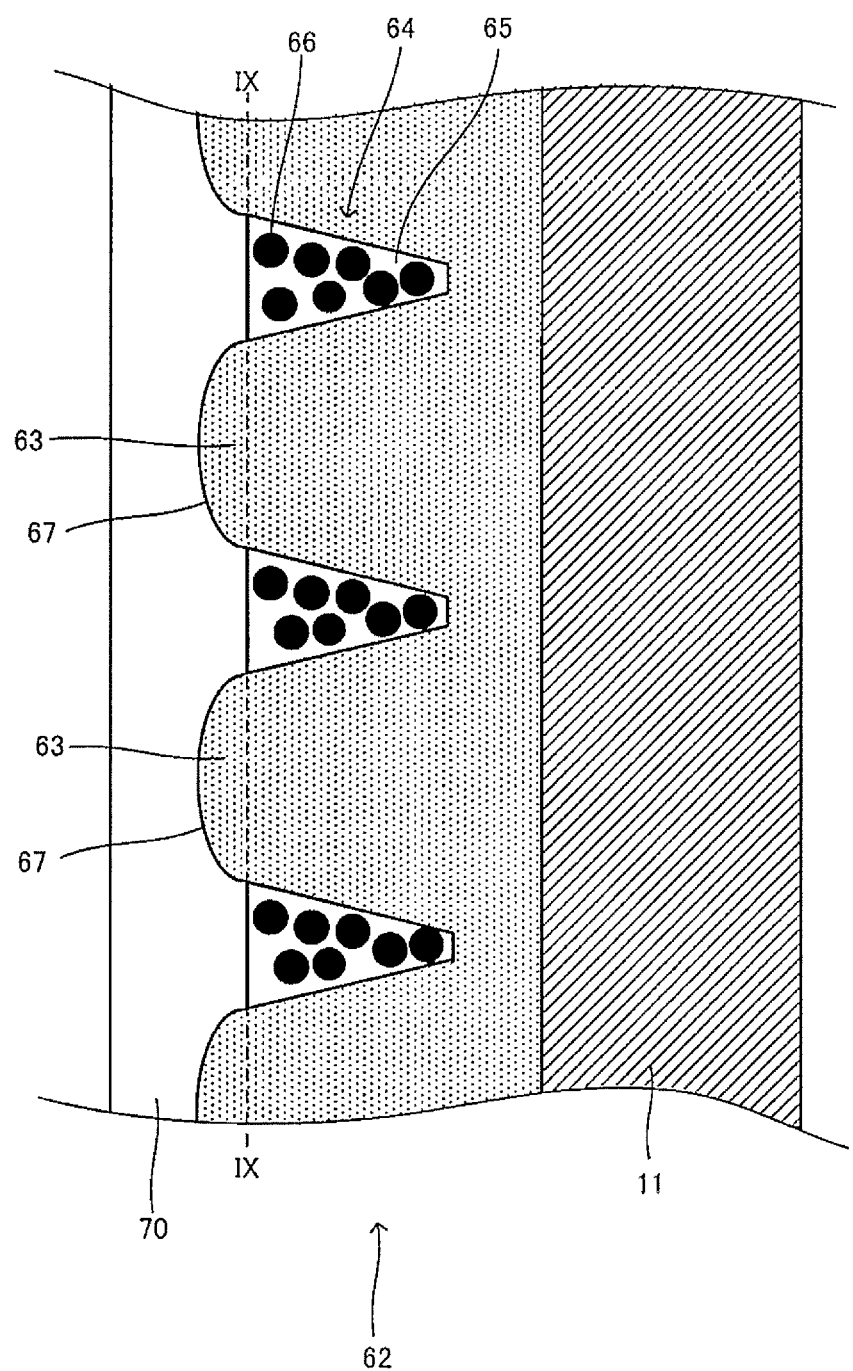
FIG. 9 is an enlarged cross-sectional view showing a part of the optical functional layer of the optical sheet provided to the image source unit shown in FIG. 8.

As shown in FIG. 8, the optical functional layer 62 comprises: a light-transmissive portion 63 of which cross sectional shape is substantially trapezoid in a cross section perpendicular to the output face of the optical sheet 60; and the light-absorbing portions 64 arranged between the light-transmissive portions 63. FIG. 9 is an enlarged cross-sectional view of the optical sheet in which three light-absorbing portions 64 and the adjacent light-transmissive portions 63 are shown. The optical functional layer 62 will be described with reference to FIGS. 8 and 9 as well as adequately indicated drawings.

In the light-transmissive portion 63, the shorter upper base side and the longer lower base side of the substantially trapezoid are arranged along the sheet face of the optical sheet 60. Here, as seen from FIGS. 8 and 9, the shorter upper base side of the light-transmissive portion 63 is formed so that the protrusion seen from the light-transmissive portion 63 is the convex lens portion 67. So, the convex lens portion 67 in this cross section is swelling toward the image light source side with respect to a line obtained by connecting ends of the image light source side face of the two adjacent light-absorbing portions 64 (see the broken line IX-IX in FIG. 9). Therefore, by the refractive index difference from that of the adjacent adhesive layer 70 and the effect of the lens shape, it is possible to converge the optical path of the image light in the direction closer to the direction normal to the front face. The difference of the refractive index between the convex lens portion 67 and the adhesive layer 70, and the optical path will be described later.

The shape of the convex lens portion 67 is not particularly limited as long as the convex lens portion can converge the optical path of the image light into a direction closer to the direction normal to the front face in the above-described manner. Examples of the shape include the spherical and the nonspherical shape. The pitch of the convex lens portion 67 is preferably 30-100 μm.

Other elements of the light-transmissive portion 63 are in common with those of the light-transmissive portion 13 of the optical sheet 10; so the descriptions is omitted.

The light-absorbing portion 64 is formed by filling a binder 65, in which light-absorbing particles 66 are dispersed, between the light-transmissive portions 63. The light-absorbing portion 64 in this embodiment is different from the light-absorbing portion 14 from the point that the light-absorbing portion 64 does not have the recess portion. Other elements are in common with those of the light-absorbing portion 14, so the descriptions will be omitted.

Next, the adhesive layer 70 will be described. The adhesive layer 70, in the optical functional layer 62, is laminated on the face where the convex lens portion 67 is formed for the purpose of adhering the optical functional layer 62 to another member.

The refractive index of the adhesive layer 70 is a refractive index $N_n$ which is at least lower than a refractive index $N_p$ of the light-transmissive portion 63. By setting refractive index $N_n$ so, as described below, the convex lens portion 67 can control the optical path of the image light toward the front side direction adequately. That is, the convex lens portion 67 projects toward the image light source 5 side; and the refractive index at the observer side of the interface between the convex lens portion 67 and the adhesive layer 70 is set to be higher than the refractive index at the image light source side of the interface.

Other elements of the adhesive layer 70 are in common with those of the adhesive layer 20 of the above-described optical sheet 10; so, the descriptions will be omitted.

Figure 10:
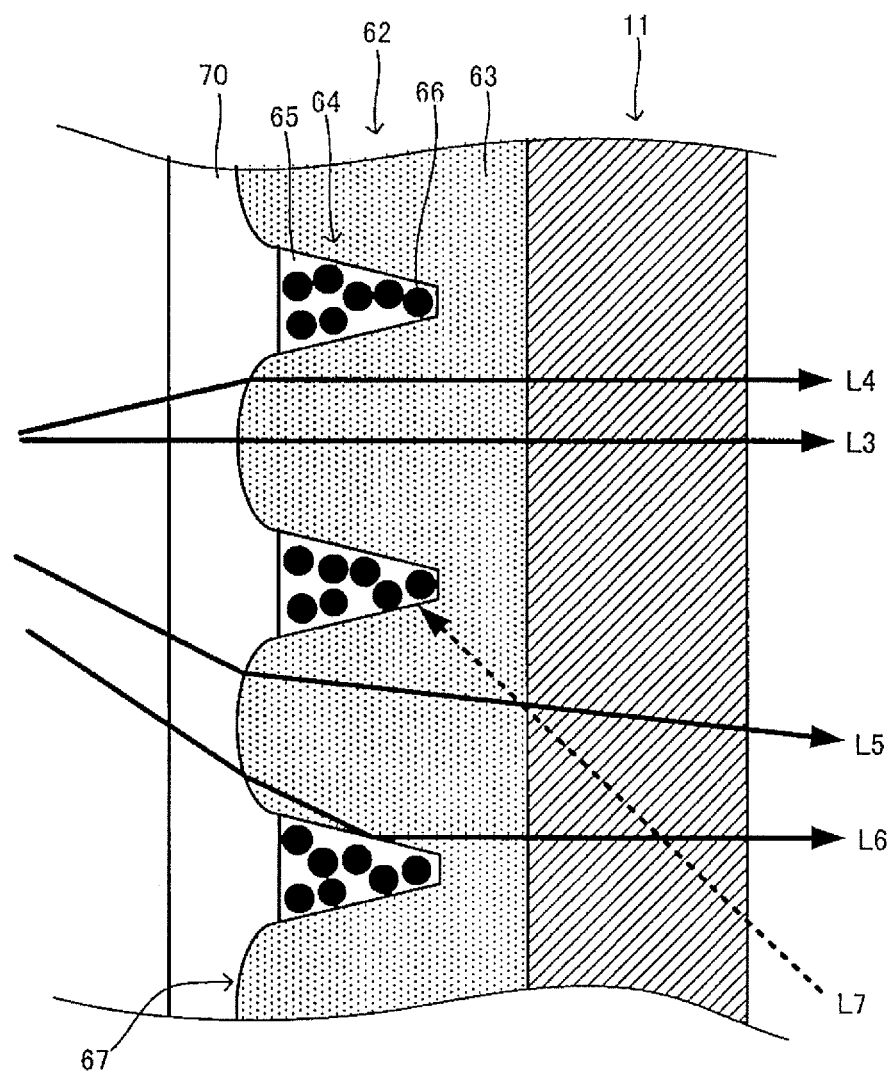
FIG. 10 is a schematic view showing examples of optical path of the image light passing through the optical functional layer.

Such an image source unit 54 can be used for the image display unit. Hereinafter, the mechanism how the front brightness can be improved by using the image display unit comprising the image source unit 54 will be described with reference to the examples of optical path of, for example, the image light. The examples of the optical path are shown in FIG. 10.

The image light L3 is a light emitted parallel with the normal direction of the sheet from the image light source (PDP) 5 and passes through the apex of the convex lens portion 57; therefore, the light is transmitted to the front face without being refracted.

The image light L4 is an image light which enters into the light-transmissive portion 63 at a slight angle to the normal direction of the sheet. The image light L4 is corrected to travel parallel with substantially the normal direction of the sheet and transmitted to the front face by the effect of the convex lens portion 67.

The image light L5 is an image light which enters into the light-transmissive portion 63 at a considerable angle with respect to the normal direction of the sheet. By the effect of the convex lens portion 67, even such image light L5 can be refracted at a closer angle to the normal direction of the sheet, which results in the improvement of the front brightness.

The image light L6 is an image light which enters into the light-transmissive portion 63 at a considerable angle with respect to the normal direction of the sheet in the same manner as the traveling of the image light L5. The image light L6 is the image light which is certainly absorbed by the light-absorbing portion 64 if the convex lens portion 67 is not provided. However, by the effect of the convex lens portion 67, the image light L6 can be refracted at an angle closer to the normal direction of the sheet and the refracted light can be reflected at the interface between the light-absorbing portion 64 and the light-transmissive portion 63; and the refracted image light L6 is outputted.

The external light L7, on the other hand, enters into the light-absorbing portion 64 and is absorbed by the light-absorbing particle 66. Accordingly, the contrast can be improved.

As seen above, the image source unit 54 can be provided with a layer structure suitable for applying the image display unit such as plasma television and can improve the front brightness and the use efficiency of the image light.

Figure 11:
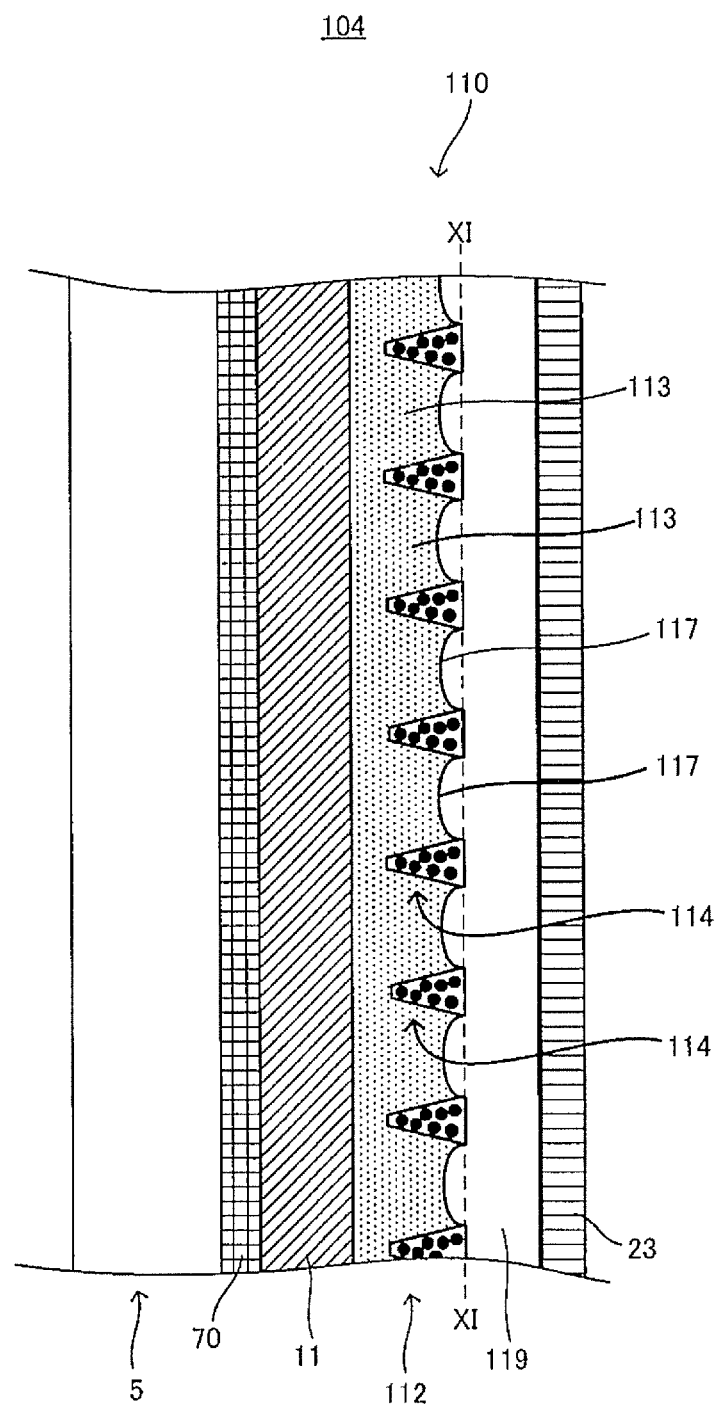
FIG. 11 is a schematic view showing a part of the cross section of the image light unit according to another embodiment.

FIG. 11 is a schematic view showing a layer structure of the image light unit 104 in cross section, according to another embodiment. The image source unit 104 comprises: the plasma display panel 5 (PDP 5) as an image light source 5; and an optical sheet 110. The optical sheet 110 is a sheet-type member which is arranged at the image output side of the image light source 5 and outputs the light entered from the image light source 5 side to the observer side.

A plasma display panel 5 may be a conventional one.

The optical sheet 110 comprises: the antireflection layer 23, the optical functional layer 112, the high-refractive index layer 119, the base material layer 11, and the adhesive layer 70; and these layers are laminated. In the embodiment, each of the above layers has a cross sectional shape shown in FIG. 11 and extends from the front to the back of the drawing. The base material layer 11 and the antireflection layer 23 are in common with those of the optical sheet 60, so the description will be omitted. Moreover, the adhesive layer 70 may be the one which can adhere the optical sheet 110 to the PDP 5; it is made of a conventional adhesive.

Hereinafter, the optical functional layer 112 and the high-refractive index layer 119 will be described.

The optical functional layer 112, as shown in FIG. 11, comprises: light-transmissive portions 113 having substantially trapezoid shape in cross section perpendicular to the output face of the optical sheet 110; and a light-absorbing portion 114 arranged between the light-transmissive portions 113.

Figure 13:
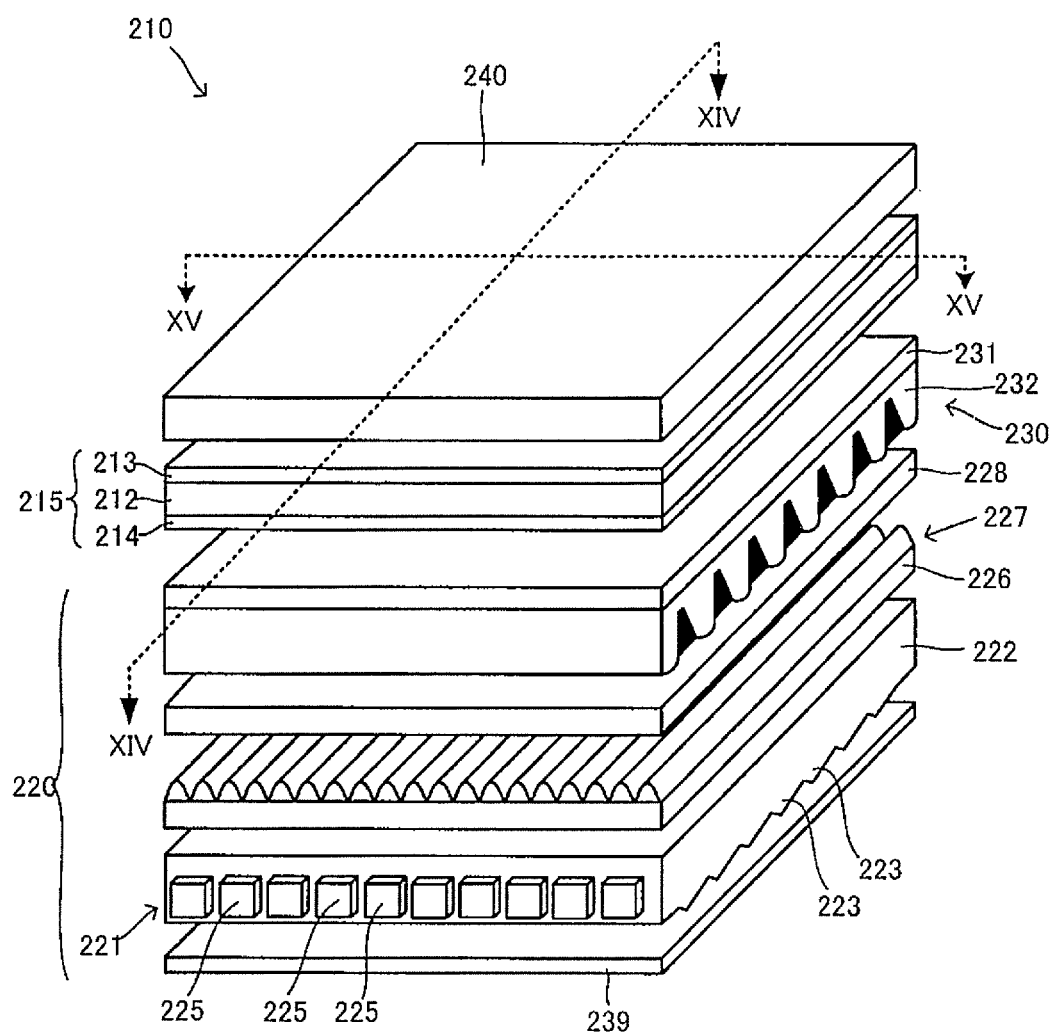
FIG. 13 is an exploded perspective view to explain an image source unit 210.

In the light-transmissive portion 113, the shorter upper base side and the longer lower base side of the substantially trapezoid cross sectional shape are arranged along the sheet face of the optical sheet 110. The upper base side of the light-transmissive portion 113, as seen from FIG. 13, is formed in a manner to be a concave lens portion 117 seen from the light-transmissive portion 113. Hence, the face equivalent to the shorter upper base (i.e. the observer side face) of the substantially trapezoid cross sectional shape of the embodiment has recesses of which bottom faces toward the base material layer 11 side with respect to the broken line XI-XI in FIG. 11. Accordingly, by the difference of the refractive index between the light-transmissive portion 113 and the adjacent high-refractive index layer 119 and effect of the lens shape, it is possible to converge the optical path of the image light emitted from the image light source in the direction closer to the direction normal to the front face. The high-refractive index layer 119, the relation of the refractive index difference, and the optical path will be described later.

The shape of the concave lens portion 117 is not particularly limited as long as it can converge the optical path of the image light in the above direction closer to the direction normal to the front face. Examples of the shape include: spherical shape and nonspherical shape. The pitch of the concave lens portion 117 is preferably 30-100 μm.

Other elements of the light-transmissive portion 113 are in common with the light-transmissive portion 63 of the optical sheet 60, so the descriptions will be omitted.

The light-absorbing portion 114 is also in common with the above-described light-absorbing portion 64, so the description will be omitted.

Next, the high-refractive index layer 119 will be described. The high-refractive index layer 119 is laminated on the face of the above-described optical functional layer 112 where the concave lens portion 117 is formed and has protrusions corresponding to the shape of concave lens portion 117; thereby the high-refractive index layer 119 can form an interface between the concave lens portion 117 and the high-refractive index layer 119. The refractive index of the high-refractive index layer 119 is refractive index $N_k$ which is larger than at least the refractive index $N_p$ of the light-transmissive portion 113. Accordingly, as described below, it is possible to more adequately control the optical path of the image light to the front face side by the concave lens portion 117. The high-refractive index layer 119 is preferably made of a material having a refractive index of 1.6 or more; the material is preferably, for example, a zirconia-based or a florene-based material (manufactured by Osaka Gas Chemicals Co., Ltd.).

Figure 12:
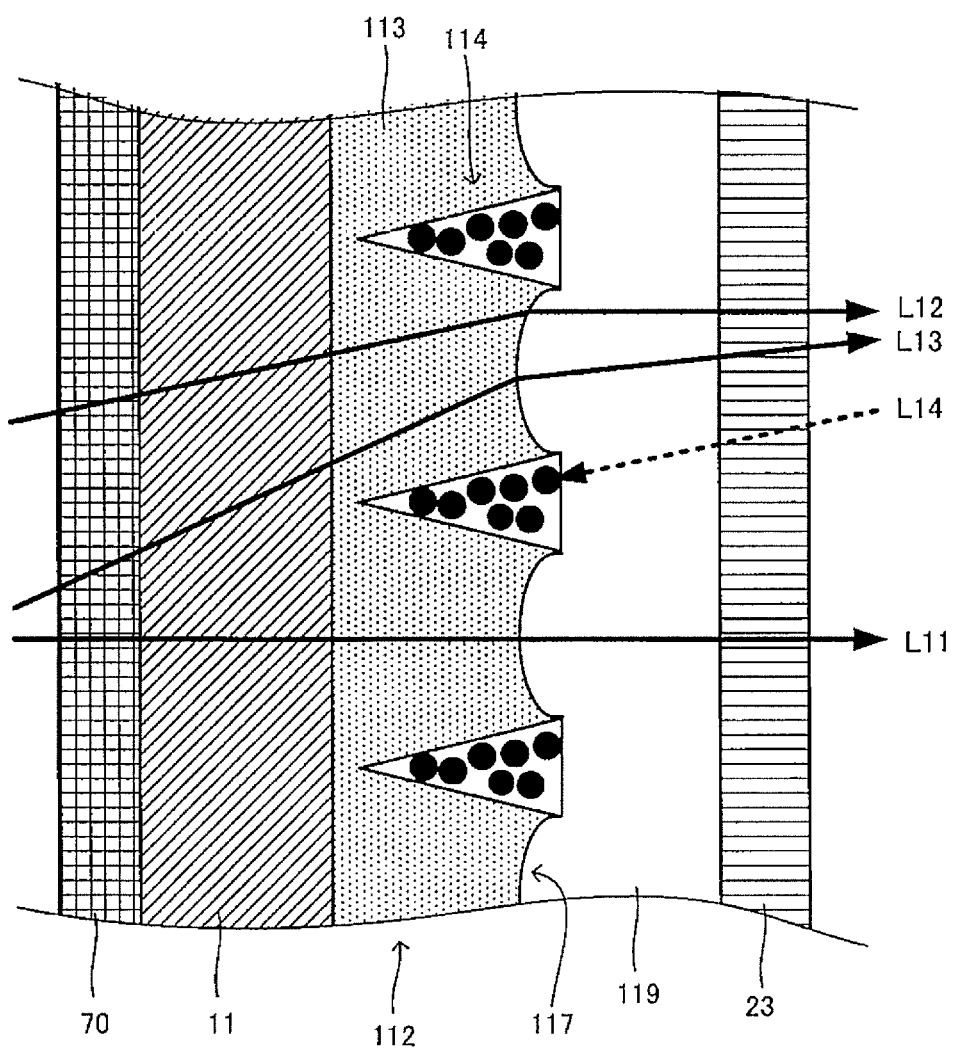
FIG. 12 is a schematic view showing examples of optical path of the image light passing through the optical functional layer.

According to the image source unit 104, it has an adequate layer structure suitable for the image display unit of, for example, plasma television, thereby it is possible to improve the front brightness. In this case, concave lens portion 117 of the optical functional layer 112 is arranged so that it faces the observer side. In FIG. 12, examples of the optical patties are shown.

The image light L11 is a light emitted from the image light source and transmitted in parallel with the normal direction of the sheet. Since the image light L11 passes through the deepest part of the concave lens portion 117, the light is transmitted to the front face without refraction.

The image lights L12 and L13 are image lights which respectively enter into the light-transmissive portion 113 at a certain angle with respect to the normal direction of the sheet. By the effect of the concave lens portion 117, such image lights L12 and L13 are refracted so that the refracted light has an angle closer to the normal direction of the sheet; and the refracted image lights L12 and L13 are outputted.

On the other hand, the external light L14 enters into the light-absorbing portion 114 and absorbed by the light-absorbing particles existing in the light-absorbing portion 114. Because of this, it is possible to improve the contrast.

Figure 14:
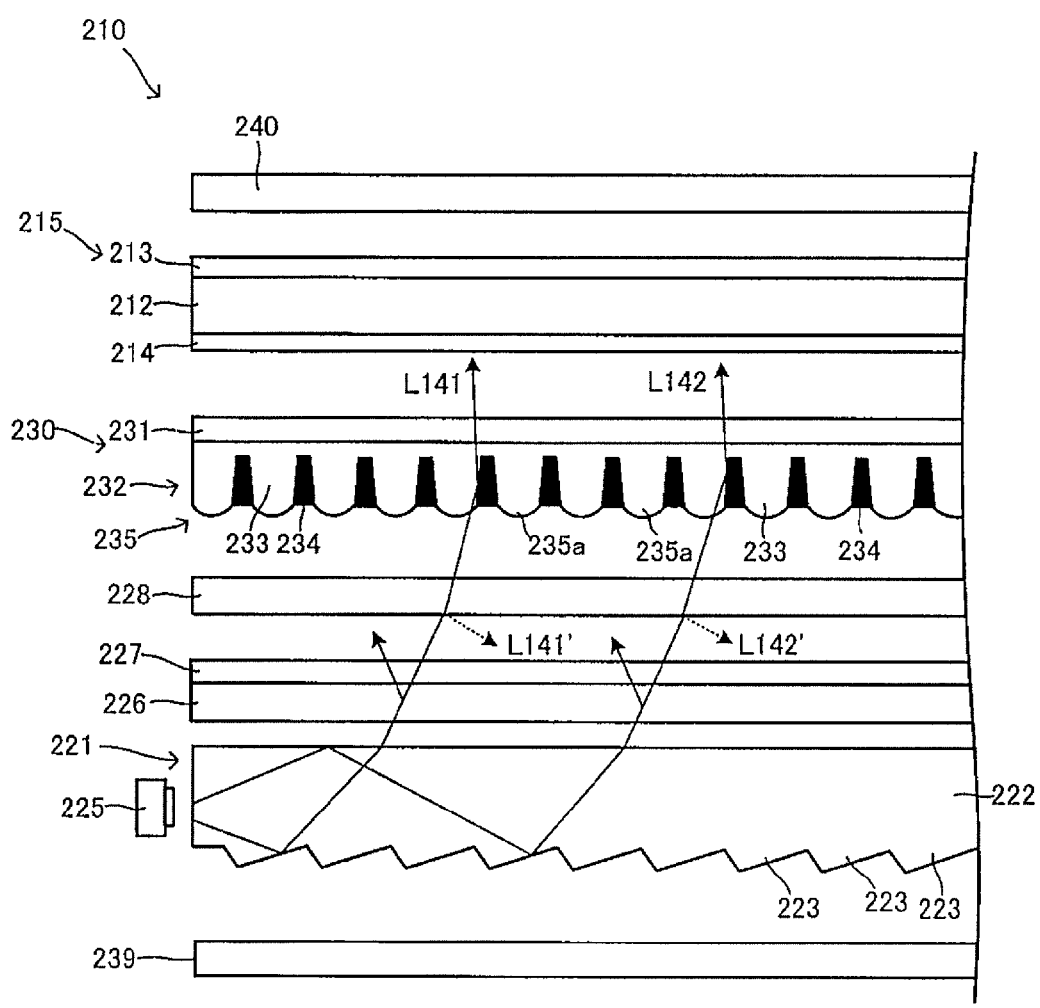
FIG. 14 is an exploded view showing one cross section of the image source unit 210.
Figure 15:
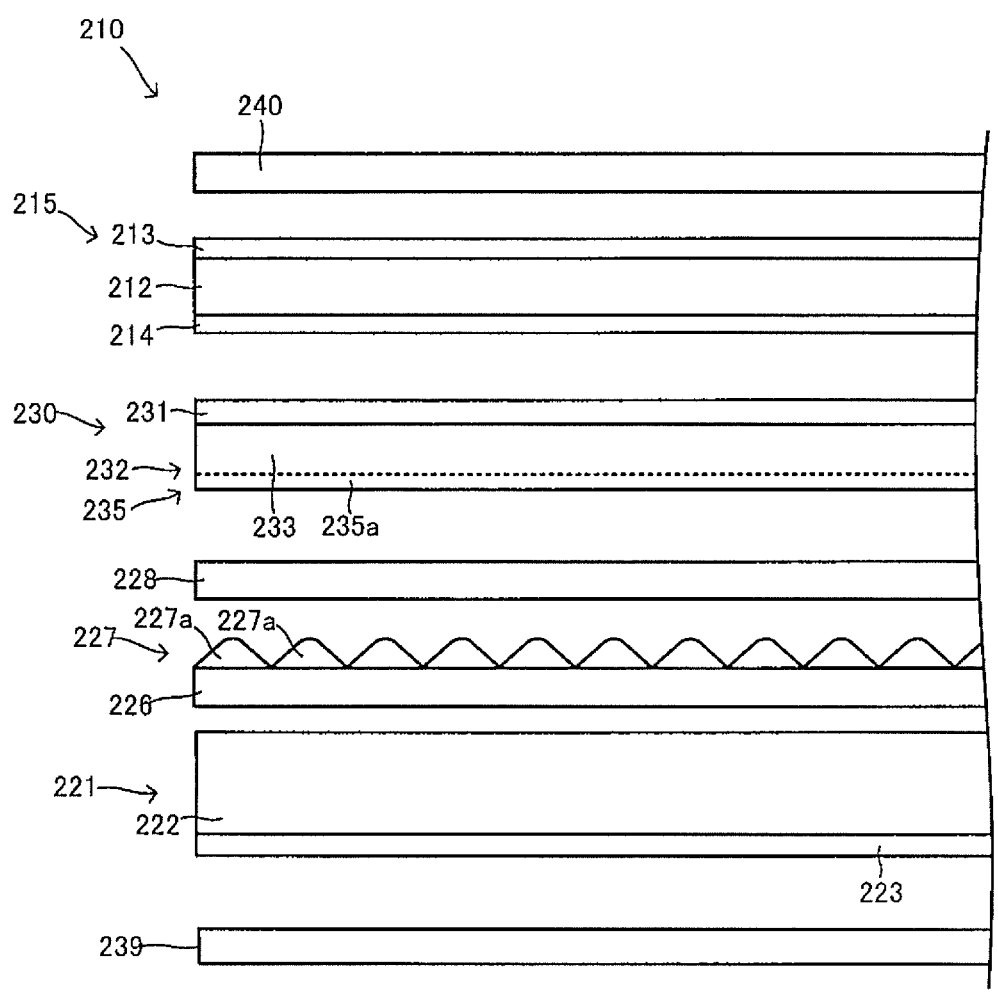
FIG. 15 is an exploded view showing another cross section of the image source unit 210.

FIG. 13 is a view for explaining another embodiment. FIG. 13 is an exploded perspective view showing an image source unit 210 included in a display device. FIG. 14 shows a part of an exploded view of a cross section of the image source unit 210 cut along the line shown by XIV-XIV in FIG. 13, and FIG. 15 shows a part of an exploded view of a cross section of the image source unit 210 cut along the line shown by XV-XV in FIG. 13. In addition to the image source unit 210, the display device includes general devices required to function as a display device, such as a housing for containing the image source unit, a power source for activating the image source unit, an electronic circuit for controlling the image source unit, though their explanations are omitted. Hereinafter the image source unit 210 will be described.

The image source unit 210 includes a liquid crystal panel 215, a surface light source device 220, and a functional film 240. In FIG. 13, the upper side of the drawing sheet is the observer side.

The liquid crystal panel 215 includes: an upper polarizing plate 213 arranged on the functional film 240 side (observed side); a lower polarizing plate 214 arranged on the surface light source device 220 side; and a liquid crystal layer 212 arranged between the upper polarizing plate 213 and the lower polarizing plate 214. The polarizing plates 213 and 214 have a function to: divide incident light into two polarization components (P wave and S wave) that are orthogonal to each other; transmit the polarization component (for example, P wave) of one direction (a direction parallel to a transmission axis); and absorb the polarization component (for example, S wave) of the other direction (a direction parallel to an absorption axis) which is orthogonal to the above direction.

In the liquid crystal layer 212, a plurality of pixels are arranged in a matrix on a plane, in a direction along the layer surface. An electric field may be applied on a region to region basis, each region forming one pixel. The alignment of the pixels on which the electric field is applied varies. With this, the polarization component transmitted through the lower polarizing plate 214 arranged on the surface light source device 220 side (i.e. the light input side) and parallel to a transmission axis (for example, P wave) rotates the polarization direction thereof by 90° when passing through the pixels on which the electric field is applied, whereas maintaining the polarization direction thereof when passing through the pixels on which the electric field is not applied. As such, based on whether the electric field is applied on the pixels or not, it is possible to control whether the polarization component (for example, P wave) transmitted through the lower polarizing plate 214 is further transmitted through the upper polarizing plate 213 arranged on the light output side, or is absorbed and blocked by the upper polarizing plate 213.

In this way, the liquid panel 215 has a structure of controlling, on a pixel to pixel basis, transmission or blocking of the light emitted from the surface light source device 220 to display an image.

Based on this principle, the liquid crystal panel is capable of providing an image to an observer. Thus, in a case where lighting is provided from the rear face side of the liquid crystal panel, it is possible to increase the use efficiency of light by making a lot of light having the polarization component parallel to the transmission axis of the lower polarizing plate reach and transmit through the lower polarizing plate.

Further, the liquid crystal panel produces by its nature excellent contrast of the emitted light and excellent efficiency (transmissivity) with regard to the light incident in a direction normal to the liquid crystal panel. However, the problems of degradation of the contrast and efficiency (transmissivity) occur with regard to the light incident obliquely against the direction normal to the liquid crystal panel, and also in a case of an oblique observation by an observer. That is, in order to increase the use efficiency of light, making a lot of light incident from the direction normal to the liquid crystal panel is also effective.

The kind of the liquid crystal panel is not particularly limited, and a liquid crystal panel of a known type can be used. Examples thereof include TN, STN, VA, MVA, IPS, OCB, and the like.

As the upper polarizing plate and the lower polarizing plate, polarizing plates having known structures can be used. Generally the upper polarizing plate and the lower polarizing plate have such a structure that two sides of a polyvinyl alcohol (PVA) layer are sandwiched by layers of triacetylcellulose (TAC).

Next, the surface light source device 220 will be described.

The surface light source device 220 is a lighting device arranged on a side of one face of the liquid crystal panel 215, the face being opposite from the observer side face, and emits planer light to the liquid crystal panel 215. As seen from FIGS. 13 and 14, the surface light source device 220 of this embodiment is an edge-light type surface light source device, and includes a light guide plate 221, a light source 225, a light diffuser plate 226, a prism layer 227, a reflection type polarizing plate 228, an optical sheet 230, and a reflection sheet 239.

As seen from FIGS. 13 and 14, the light guide plate 221 includes a base portion 222 and a back face optical element 223. The light guide plate 221 is a plate-like member formed by a material having a transmitting property. In this embodiment, one plate face side of the light guide plate 221 to be the observer side is made to be a smooth surface. The other plate face side which is the opposite side of the observer side is made to be a back face. On the back face, a plurality of back face optical elements 223 are arranged.

Various materials may be used as the material for the base portion 222 and the back surface optical element 223. A material widely used for optical sheets incorporated into a display device, having excellent mechanical properties, optical properties, stability, workability, and the like, and being available at a low cost may be used. For example, polymer resins having alicyclic structure, metacrylate resins, polycarbonate, polystyrene, acrylonitril-styrene copolymer, methylmethacrylate-styrene copolymer, ABS resin, thermoplastic resins such as polyether sulfone, epoxy acrylate-based or urethane acrylate-based reactive resins (ionizing radiation curable resins and the like) may be used.

The base portion 222 is a plate having a predetermined thickness, being a portion to be a base of the back face optical element 223. Light is guided inside the base portion 222.

The back face optical element 223 is a projected element formed on the back face side (opposite side of the side where the reflection type polarizing plate 228 is arranged) of the base portion 222. In this embodiment, the back face optical element is formed in a triangular prism. The back face optical element 223 has a pillar shape and its projecting top portion has a ridge line extending in the horizontal direction of the drawing sheet of FIG. 13. A plurality of back face optical elements 223 are arranged in a direction orthogonal to the extending direction of the back face optical element 223, in predetermined pitches. The back face optical element 223 of this embodiment has a pillar shape having a triangular cross section. However, the shape of the back face optical element 223 is not limited thereto, and may be in any shape such as a pillar having a polygonal cross section, a pillar having a hemispherical cross section, having a cross section formed in a hemisphere, having a cross section formed in a part of a sphere, and having a cross section formed in a lens shape. In addition, the back face optical element 223 may have a configuration in which white dot shapes are formed by printing.

The arrangement direction of the plurality of back face optical elements 223 is preferably in the light guiding direction. That is, the back face optical elements 223 are arranged in the direction separating from the light source 225, and the ridge line of each back face optical element 223 extends parallel to the arrangement direction of the plurality of light sources 225 or, if the light source 225 is one long light source, parallel to the direction in which the light source is extending.

Here, the "triangular shape" mentioned in the description of the present application does not only refer to a triangular shape in a strict sense, but also includes a substantially triangular shape encompassing limitations in the manufacturing techniques, errors occurring at the time of forming a shape, and other factors. Likewise, other terms used in the description of the present application which specify a shape or geometric conditions, for example the terms such as "parallel" "orthogonal", "oval" and "circle" are not limited strictly, but are interpreted encompassing the errors that still enable similar optical functions to be attained.

The light guide plate 221 having the above described configuration can be produced by extrusion molding or by forming the back face optical element 223 on the base portion 222. In the light guide plate 221 produced by extrusion molding, the base portion 222 and the back face optical element 223 may be formed integrally with each other. In addition, in a case of producing the light guide plate 221 by forming the back face optical element 223 on the base portion 222, the back face optical element 223 may be constituted by the same resin material as the material to constitute the base portion 222, or it may be constituted by a different material.

Back to FIGS. 13 and 14, the light source 225 will be described. Of side faces of the base portion 222 of the light guide plate 221, the light source 225 is arranged on one side face in the arrangement direction of the plurality of back face optical elements 223. The kinds of the light source are not particularly restricted; the light source can be configured in various forms, and for example a fluorescent lamp such as a linear cold cathode tube, a point-like LED (light emitting diode), or an incandescent light bulb can be used. In the present embodiment, the light source 225 is formed by a plurality of LEDs, and is configured such that the turning-on/off of each LED, and/or the brightness of each LED when turned on can be adjusted by a control device not shown, independently.

In the present embodiment, an example in which the light source 225 is arranged on the one side face, as described above. However, a configuration in which light sources are arranged on both side faces. In this case, the shape of the back face optical element is formed copying known examples.

Next, the light diffuser layer 226 will be described. The light diffuser layer 226 is a layer arranged on the light output side of the light guide plate 221 and having a function to diffuse and emit the light entered into the light diffuser layer 226. This makes it possible to further increase the uniformity of the light emitted from the light guide plate 221 and make the scars existing on the light guide plate 221 less noticeable.

As a specific configuration of the light diffuser layer, a known light diffuser layer may be employed. For example, a configuration in which a light diffusing agent is dispersed in a base material may be employed.

As seen from FIGS. 13 to 15, the prism layer 227 is a layer arranged on the liquid crystal panel 215 side from the light diffuser layer 226, and having a unit prism 227a convex toward the liquid crystal panel 215. The unit prism 227a extends in the direction orthogonal to the light guiding direction of the light guide plate 221 having a predetermined cross section. A plurality of unit prisms 227a are arranged in the light guiding direction. In addition, the extending direction of the unit prism 227a is parallel to the extending direction of the light transmissive portion 233 and the light absorbing portion 234, which are described later. This makes it possible to change the direction of the light entering into the light transmissive portion 233 and the light absorbing portion 234 to the front direction, whereby it is possible to reduce light to be absorbed in the light absorbing portion 234, which results in a further improvement of the use efficiency of light.

The shape of the cross section of the unit prism of the prism layer can have a known shape, according to required functions. In this embodiment, the cross section of the unit prism is formed in a manner to have a function to concentrate light to the front direction. However, by contraries, light can be further diffused depending on the shape of the cross section.

Next, the reflection type polarizing plate 228 will be described. The reflection type polarizing plate 228 has a function to: divide incident light into two polarization components (P wave and S wave) that are orthogonal to each other; transmit the polarization component (for example, P wave) of one direction (a direction parallel to a transmission axis); and reflect the polarization component (for example, S wave) of the other direction (a direction parallel to a reflection axis) which is orthogonal to the above direction. A known structure can be applied to the structure of the reflection type polarizing plate.

Here, the extending direction of the transmission axis of the reflection type polarizing plate 228 is preferably same as the extending direction of the transmission axis of the above-described lower polarizing plate 214, and having an angle of no less than 0° and no more than 41.7° to the direction of the extension of the light transmissive portion 233 and the light absorbing portion 234 of the optical functional layer 232 which is described later, in the front view of the image source unit 1. More preferably, the angle is no less than 0° and no more than 20°.

Figure 16:
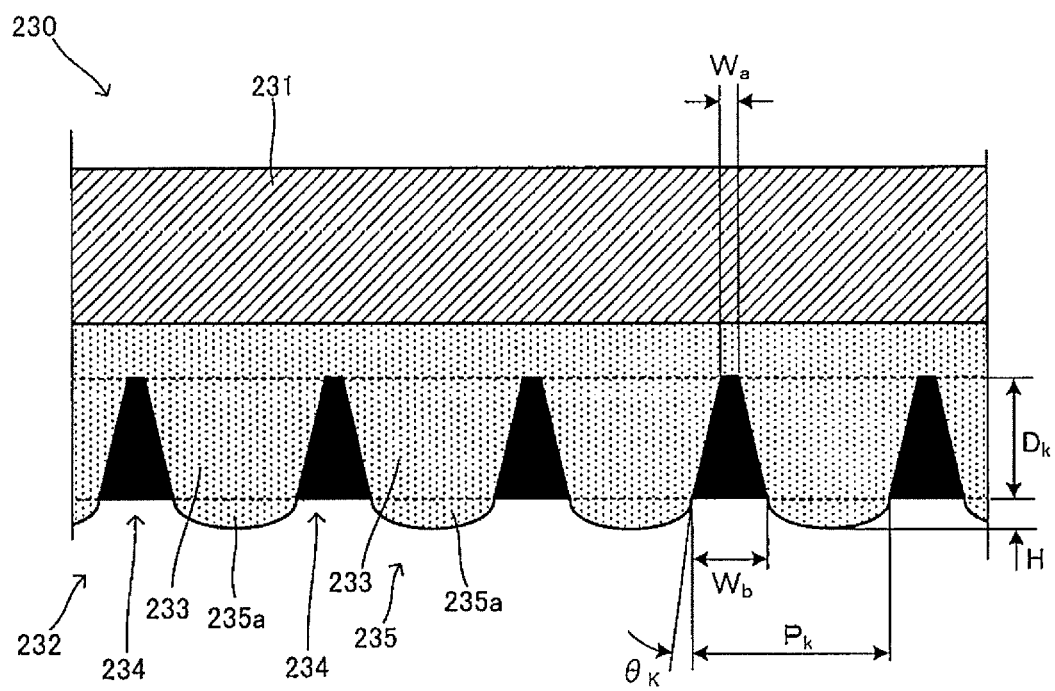
FIG. 16 is an enlarged view focusing on a part of an optical sheet 230 in FIG. 14.
Figure 17:
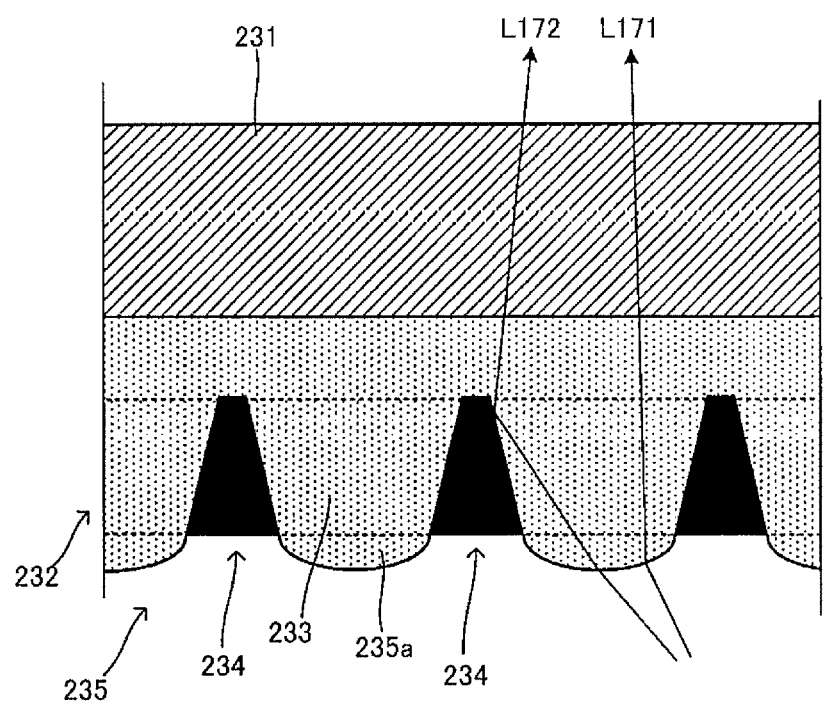
FIG. 17 is a further enlarged view focusing on a part of the optical sheet 230 in FIG. 14.

Next, the optical sheet 230 will be described. As seen from FIGS. 13 to 15, the optical sheet 230 includes: a base material layer 231 formed in a sheet; an optical functional layer 232 arranged on one face (in this embodiment, the face on the light guide plate 221 side) of the base material layer 231; and a light input control layer 235 arranged on a side of the optical functional layer 232, the side being opposite from the side where the base material layer 231 is arranged. FIG. 16 is a view focusing on the portion of the optical sheet 230 of FIG. 14. FIG. 17 is a further enlarged view of FIG. 16.

As described later, this optical sheet 230 has a function to change the traveling direction of the light entered from the light input side, to emit the light from the light output side, and increasing the brightness in the front direction (normal direction). Thus, the optical sheet 230 controls the viewing angle to inhibit output of light to a direction in which troubles occur if the light is emitted. At the same time, the controlled light is not absorbed but changes its direction to the front direction to be emitted. Therefore, it is possible to use light effectively. On the other hand, the optical sheet 230 has a function to absorb light (light absorbing function)

came with a large angle to the front direction. Therefore, it is possible to absorb unwanted light such as stray light.

As seen from FIGS. 13 to 15, the base material layer 231 is a sheet-shaped material like a flat plate, and it supports the optical functional layer 232.

As the material to form the base material layer 231, various materials may be used. A material widely used for optical sheets incorporated into a display device, having excellent mechanical properties, optical properties, stability, workability, and the like, and being available at a low cost may be used. Examples thereof include polyethylene terephthalate (PET), triacetylcellulose (TAC), methacrylate resin, polycarbonate, and the like. Among them, considering the combination with the surface light source device 220 and the lower polarizing plate 214, it is preferable to use TAC, a methacrylate resin, or polycarbonate, whose birefringence is low. Further, for uses where a high heat resistance property is required such as use in vehicle, polycarbonate which has a high glass-transition point is desirable. Specifically, the glass-transition point of the polycarbonate is 143° C., which is suitable for use in vehicle in which durability at 105° C. is generally required.

The optical functional layer 232 is a layer laminated on one face of the base material layer 231 (in this embodiment, the face on the light guide plate 221 side). Along the layer face of the optical functional layer 232, the light transmissive portion 233 and the light absorbing portion 234 are alternatively arranged.

The optical functional layer 232 has a shape of extending in a back/front direction of the drawing sheet of FIG. 16, with a cross section shown in FIG. 16. In specific, it includes the light transmissive portion 232 being substantially trapezoidal and the light absorbing portion 234 formed between the two adjacent light transmissive portions 233 and having a substransially trapezoidal cross shape, in the cross section shown in FIG. 16.

The light transmissive portion 233 is a part which mainly functions to transmit light; and in this embodiment, is an element which has a substantially trapezoidal cross section with a longer lower base on the base material layer 231 side and a shorter upper base on the opposite side (light guide plate side) in the cross section shown in FIGS. 14 and 16. The light transmissive portions 233 extend in the above-described direction keeping the cross section along the layer face of the base material layer 231, and are arranged in a low in a different direction from the extending direction, with predetermined intervals; and the intervals having a substantially trapezoidal cross section are formed between the adjacent light transmissive portions 223. Accordingly, each interval has a trapezoidal cross shape with a longer lower base on the side where the upper base of the light transmissive portion 233 is positioned in the light guide plate 221 side and a shorter upper base on the side where the lower base of the light transmissive portion 233 is positioned in the liquid crystal panel side; and a necessary material described below is filled therein to form the light absorbing portion 234. In this embodiment, the adjacent light transmissive portions 233 are connected on the longer lower base side.

The light transmissive portion 233 is configured to have a refractive index of Nt. Such a light transmissive portion 233 can be formed by curing a composition for constituting a light transmissive portion. Details will be given later. The value of the refractive index Nt is not particularly restricted; in view of properly reflecting (including total reflection) light at an interface between the light transmissive portion 233 and the light absorbing portion 234 at the oblique planes of the trapezoidal cross section, it is preferably no less than 1.55, as described later. However, a material having too high refractive index tends to be cracked. Therefore it is preferably no more than 1.61, and more preferably no more than 1.56.

The light absorbing portion 234 functions as an in-between portion formed in the above-described interval formed between the adjacent light transmissive portions 233, and has a same cross sectional shape as that of the interval. Therefore, the shorter upper base faces the liquid crystal panel 215 side, and the longer lower base faces the light guide plate 221 side. The light absorbing portion 234 is configured to have a refractive index of Nr and to be able to absorb light. Specifically, light absorbing particles are dispersed in a binder having the refractive index of Nr. The refractive index Nr is smaller than the refractive index Nt of the light transimissive portion 233. In this way, by making the refractive index of the light absorbing portion 234 smaller than the refractive index of the light transmissive portion 233, it is possible to make the light that has entered the light transmissive portion 233 totally reflected properly, at the interface between the light transmissive portion 233 and the light absorbing portion 234, under the predetermined conditions. Even if the conditions of the total reflection are not satisfied, part of light reflects at the interface.

The value of the refractive index Nr is not particularly restricted; however, in view of properly making the total reflect, it is preferably no more than 1.50, and in view of the availability of the material to employ, it is preferably no less than 1.47, more preferably no less than 1.49.

The difference between the refractive index Nt of the light transmissive portion 233 and the refractive index Nr of the light absorbing portion 234 is not particularly restricted; however, it is preferably no less than 0.05 and no more than 0.14. With an increased refractive index, more amount of light can be reflected.

For the optical functional layer 232, though not particularly limited, the light transmissive portion 233 and the light absorbing portion 234 are formed as described below for example. Specifically, the pitch of the light transmissive portion 233 and the light absorbing portion 234, being shown by $P_k$ in FIG. 16, is preferably no less than 20 μm and no more than 100 μm. The angle shown by $\theta_k$ in FIG. 16, the angle being formed by the interface between the light absorbing portion 234 and the light transmissive portion 233 at an oblique side and the normal line of the layer face of the optical functional layer 232, is preferably no less than 1° and no more than 10°. The thickness of the light absorbing portion 234, shown by $D_k$ in FIG. 16, is preferably no less than 50 μm and no more than 150 μm. By making these within the above ranges, it is possible to adequately balance the transmission and absorption of light.

In this embodiment, an example in which the interface between the light transmissive portion 233 and the light absorbing portion 234 forms a straight line at the cross section is shown. However, the interface is not limited to be formed in a straight line, and may be formed in a polygonal line, a shape having a convex curved surface, a shape having a concave curved surface, and the like. The cross sectional shapes of plurality of light transmissive portions 233 and light absorbing portions 234 may be same, or different having a predetermined regularity.

In addition, the cross section is not necessarily in an isosceles trapezoidal shape, but may be formed in such that one side and the other side are not in a line symmetry but the sides are inclined in different manners.

The light input control layer 235 is a layer arranged on a side of the optical functional layer 232, the side being opposite to the side where the base material layer 231 is arranged. On the light input control layer 235, a plurality of unit light input control elements 235a are arranged.

As seen from FIGS. 16 and 17, the unit light input control element 235a of this embodiment has a convex cross section having a curved line, in the same way as each example described above, and having the cross section, it extends in the same direction as the light transmissive portion 233. The light transmissive portion 233 and the unit light input control element 235a are arranged in a manner to be at a same position when the optical sheet 230 is seen from the front. In this embodiment, the unit light input control element 235a is directly arranged on the light input face of the light transmissive portion 233, to be integrated with the light transmissive portion 233. This makes it possible to arrange the unit light input control element 235a with a high accuracy of position.

The unit light input control element 235a controls the direction of light entering into the optical functional layer 232 using refraction, and changes the direction of the light closer to a direction in which the light is totally reflected at the interface between the light transmissive portion 233 and the light absorbing portion 234 and gets difficult to be absorbed by the light absorbing portion 234 (direction of the normal line of the sheet face, front direction), to progress the light. Thus, the unit light input control element 235a has a shape to have a function to change the direction of light. In this embodiment, the unit light input control element 235a has a convex shape having a curved surface, a so-called lens shape.

Here, the light input face of the light input control layer 235 has contact with an adhesive, being the interface between light input control layer 235 and the adhesive. In this embodiment, the light input control layer 235 and the reflection type polarizing plate are bonded to each other by an adhesive layer. As the adhesive layer, a same adhesive layer as the above-described adhesive layer 20 may be used. Thus the thickness of the adhesive layer 20 is preferably no less than 20 μm and no more than 50 μm. The thickness of the adhesive layer 20 is a thickness of the thickest part of the adhesive layer 20. If the thickness of the adhesive layer 20 is less than 20 μm, the conformity to unevenness reduces, which results in occurrences of problem of having air bubbles. If the thickness is over 50 μm, it gets difficult to uniformly apply an adhesive composition.

Further, it is desirable that the storage elastic modulus of the adhesive of the adhesive layer 20 is no less than 0.1 MPa and no more than 0.8 MPa. If the storage elastic modulus is larger than the above range, the conformity to unevenness reduces, which results in occurrences of problem of having air bubbles. If the storage elastic modulus is smaller than the above range, the adhesive gets soft and there is a possibility that an inconvenience in handling occurs such as a problem of getting dirty by protrusions of the adhesive composition.

In addition, the thickness of the unit light input control element, shown by H in FIG. 16, is preferably no less than 0.5 μm and no more than 6.0 μm. If the thickness is less than 0.5 μm, there is a possibility that the required optical properties cannot be obtained, and if the thickness is over 6.0 μm, there is a possibility that the light absorbing portion gets difficult to be formed, as described later.

Figure 18:
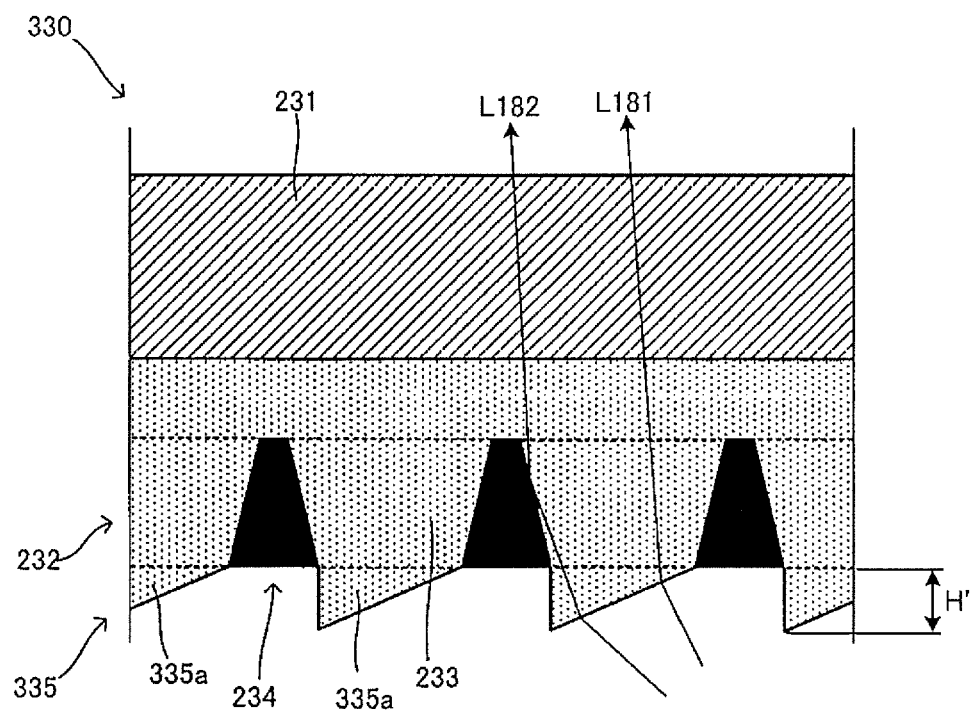
FIG. 18 is a view to explain an example of an optical sheet 330.
Figure 19:
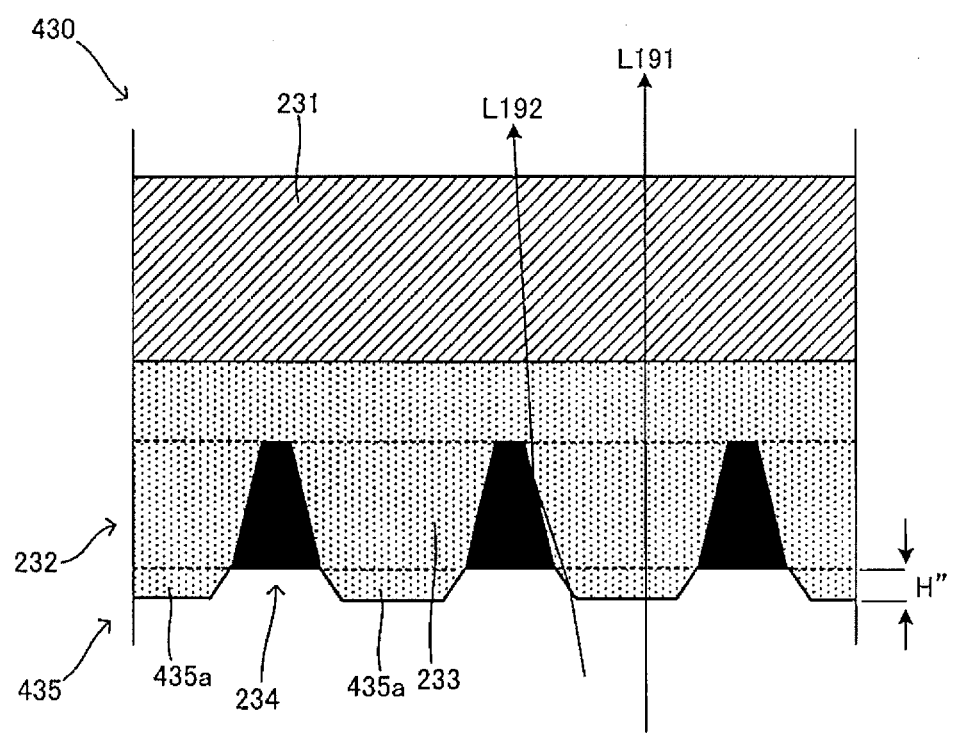
FIG. 19 is a view to explain an example of an optical sheet 430.
Figure 20:
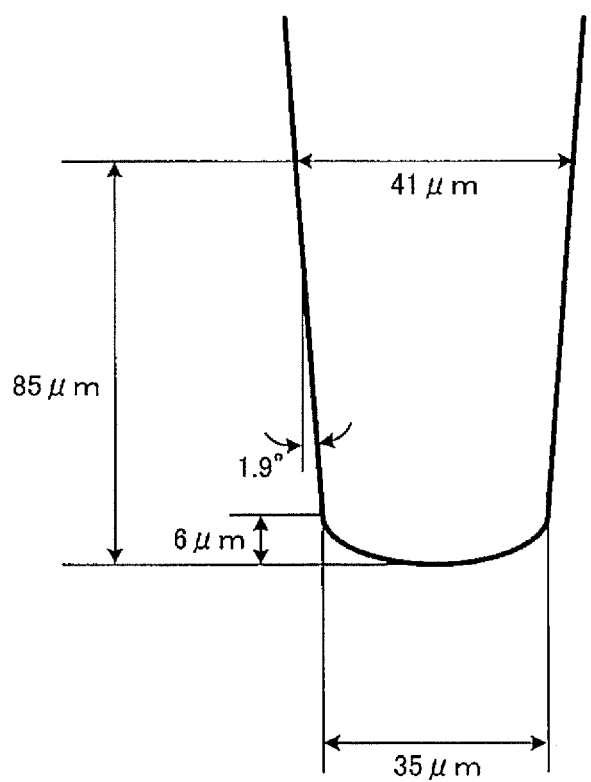
FIG. 20 is a view of a tip portion (cutting tip) of a diamond bite used in Examples, seen from the rake face side.

The unit light input control element 235a can take any configuration without particular limitations, as long as the element has a function to change the traveling direction of light to the front direction. FIGS. 18 and 19 show examples of light input control layers 335 and 435 respectively provided with unit light input control elements 335a and 435a of modification examples. FIGS. 18 and 19 are views seen from the same viewpoint as in FIG. 17.

The unit light input control element 335a extends in the same direction as the light transmissive portion 233, having a triangular cross section. The light transmissive portion 233 and the unit light input control element 335a are arranged in a manner to be at a same position when the optical sheet 330 is seen from the front. In this embodiment, the unit light input control element 335a is directly arranged on the light input face of the light transmissive portion 233, to be integrated with the light transmissive portion 233. This makes it possible to arrange the unit light input control element 335a with a high accuracy of position.

The unit light input control element 335a controls the direction of light entering into the optical functional layer 232, and changes the direction of the light closer to a direction in which the light is totally reflected at the interface between the light transmissive portion 233 and the light absorbing portion 234 and gets difficult to be absorbed by the light absorbing portion 234 (direction of the normal line of the sheet face, front direction), to progress the light.

In this embodiment, the unit light input control element 235a has a convex shape having a triangular cross section, a so-called prism shape.

The unit light input control element 435a extends in the same direction as the light transmissive portion 233, having a trapezoidal cross section. The light transmissive portion 233 and the unit light input control element 435a are arranged in a manner to be at a same position when the optical sheet 330 is seen from the front. In this embodiment, the unit light input control element 435a is directly arranged on the light input face of the light transmissive portion 233, to be integrated with the light tranmissive portion 233. This makes it possible to arrange the unit light input control element 435a with a high accuracy of position.

The unit light input control element 435a controls the direction of light entering into the optical functional layer 232, and changes the direction of the light closer to a direction in which the light is totally reflected at the interface between the light transmissive portion 233 and the light absorbing portion 234 and gets difficult to be absorbed by the light absorbing portion 234 (direction of the normal line of the sheet surface, front direction), to progress the light.

In this embodiment, the unit light input control element 435a has a convex shape having a trapezoidal cross section, a so-called prism shape. Of the trapezoidal cross section, the longer lower base has contact with the light input side of the light transmissive portion 233, and the shorter upper base is arranged on the opposite side. With this unit light input control element 435a, it is possible to transmit the light originally traveling in the front direction, without unnecessarily changing the direction of the light, therefore it is possible to further efficiently control light to the front direction.

The material of the light input control layers 235, 335 and 435 is not particularly limited, and a same material as that of the light transmissive portion 233 may be used.

The optical sheet 230 is produced in the following manner for example.

First, the light transmissive portion 223 and the light input control layer 235 are formed on the base material layer 231. In this embodiment, the light transmissive portion 233 and the light input control layer 235 are integrally formed. That is, a base material sheet to become the base material layer 231 is inserted in between a die roll having on its surface a shape that can transfer the shape of the light transmissive portion 233 and the light input control layer 235, and a nip roll arranged in a manner facing the die roll. At this time, the die roll and the nip roll are rotated while a composition for constituting the light transmissive portion is supplied in between the base material sheet and the die roll. Thereby, the composition for constituting the light transmissive portion is filled in a groove (a reversed shape of the light transmissive portion) formed on the surface of the die roll, which groove corresponds to the light transmissive portion, and accordingly the composition becomes the surface shape of the die roll.

Here, as for the composition for constituting the light transmissive portion and the light control layer, ionizing radiation-curable resins such as epoxy acrylate-based, urethane acrylate-based, polyether acrylate-based, polyester acrylate-based, polythiol-based resins may be used.

At this time, the elastic modulus of the composition for constituting the light transmissive portion after curing is preferably no less than 10 MPa and no more than 2000 MPa. This makes it possible to inhibit, in scraping off the composition for constituting the light transmissive portion by a doctor blade as described later, occurrence of breaks while adequately conforming to the pressure of scraping.

The composition for constituting the light transmissive portion sandwiched between the die roll and the base material sheet and filled therein is irradiated with a light for curing, from the base material sheet side by a light irradiation apparatus. Whereby, the resin can be cured and the shape thereof can be fixed. Then, the base material layer 231 and the molded light transmissive portion 233 and the light control layer 235 are released from the die roll by a mold release roll.

Next, the light absorbing portion 234 is formed. In order to form the light absorbing portion 234, first, a composition for constituting the light absorbing portion is filled in a gap between the above formed light transmissive portions 233. Thereafter, the excessive amount of composition is scraped off by a doctor blade or the like. Then, the remaining composition is cured by an irradiation of light for curing by a light irradiation device from the light transmissive portion 233 side; and as a result, the light absorbing portion 234 can be formed.

The material to be used as the light absorbing portion is not particularly limited, and for example, a composition in which colored light absorbing particles are dispersed in a photocurable resin such as urethane(meth)acrylate, polyester(meth)acrylate, epoxy(meth)acrylate, and butadiene (meth)acrylate may be used.

Alternatively, the whole light absorbing portion may be colored by a pigment or dye, instead of dispersing the light absorbing particles.

In a case of using the light absorbing particles, colored particles having a light absorbing property such as carbon black are preferably used as the light absorbing particles. However, the light absorbing particles are not limited thereto. Colored particles which selectively absorb light with a certain wavelength in accordance with the properties of the image light may be employed. Specific examples include: carbon black, graphite, a metal salt of black iron oxide or the like, organic particulates or glass beads colored by dye, pigment or the like. Especially, the colored organic particulates are preferably used in view of costs, quality, availability, and the like. The average particle size of the colored particles is preferably no less than 1.0 μm.

Back to FIGS. 13 to 15, the reflection sheet 239 of the surface light source device 220 will be described. The reflection sheet 239 is a member for reflecting the light emitted from the back face of the light guide plate 221 to make the light enter the light guide plate 221 again. As for the reflection sheet 239, a sheet that enables so-called specular reflection may be preferably employed, for example a sheet made of a material having high reflectance such as metal, or a sheet that includes as a surface layer, a thin film made of a material having high reflectance (for example, thin metal film).

The functional film 240 is a layer arranged on the light output side of the liquid crystal panel 215, having functions to improve the quality of an image light, protect the image source unit 210, and the like. Example thereof include anti-reflection films, anti-glare films, hard coating films, color compensation films, light diffuser films and the like. These films are used alone or in combination to form the functional film 240.

Next, the functions of the display device having the above configuration will be described while showing examples of the light path. It is noted that the examples of the light path are conceptualistic for explanation, not strictly showing the degrees of reflection and refraction.

First, the light emitted from the light source 225 enters the light guide plate 221 through the light input face on the side face of the light guide plate 221, as shown in FIG. 14. FIG. 14 shows, as one example, light paths of the lights L141 and L142 incident upon the light guide plate 221 from the light source 225.

As shown in FIG. 14, the lights L141 and L142 that have entered the light guide plate 221 repeat total reflection on the face on the light output side of the light guide plate 221 and the back face opposite thereto, due to the refractive index difference from the air; and travel in the light guiding direction (to the right of the drawing sheet of FIG. 14).

Here, the back face optical element 223 is arranged on the back face of the light guide plate 221. Therefore, as shown in FIG. 14, in some cases, the traveling directions of the lights L141 and L142 travelling through the light guide plate 221 are changed by the back face optical element 223, and thus the lights L141 and L142 enter the light output face and the face opposite thereto at an incident angle of less than a total reflection critical angle. In this case, the light may be emitted from the light output face and the face opposite thereto of the light guide plate 221.

The lights L141 and L142 emitted from the light output face travel to the light diffuser layer 225 arranged on the light output side of the light guide plate 221. On the other hand, the light emitted from the back face opposite to the light output face is reflected by the reflection sheet 239 arranged on the rear face of the light guide plate 221; and enters again the light guide plate 221 to travel through the light guide plate 221.

The light travelling through the light guide plate 221 and the light changed its direction at the back face optical element 223 and reaching the light output face having an incident angle less than a total reflection critical angle are created in each zone along the light guiding direction of the light guide plate 221. Therefore, the light travelling through the light guide plate 221 is emitted from the light output face little by little. This enables a uniform light amount distribution, along the light guiding direction, of the light emitted from the light output face of the light guide plate 221.

The light emitted from the light guide plate 221 reaches the light diffuser layer 226 to increase its uniformity. Then, the light is diffused or collected (collected in this embodiment) as necessary by the prism layer 227, and emitted from the prism layer 227. The emitted light reaches next the reflection type polarizing plate 228. Here, the light in the polarizing direction along the transmission axis of the reflection type polarizing plate 228 transmits through the reflection type polarizing plate 228 and travels to the optical sheet 230.

On the other hand, the light in the polarizing direction along the reflection axis of the reflection type polarizing plate 228 is reflected and returns to the light guide plate 221 side, as shown by arrows of dotted lines L141' and L142'. The returned light is reflected at the light guide plate 221, the back face optical element 223, or the reflection sheet 239, and travels again in the reflection type polarizing plate 228 side. In this reflection, part of the light changes its polarizing direction and transmits the reflection type polarizing plate 228. Other light returns again to the light guide plate side. In this way, by repeating the reflection, the light reflected at the reflection type polarizing plate 228 also can transmit the reflection type polarizing plate 228. This makes it possible to increase the use efficiency of the light from the light source 225.

Here, the light emitted from the reflection type polarizing plate 228, whose polarizing direction is a direction along the transmission axis of the lower polarizing plate 214, is a polarizing light which transmits the lower polarizing plate 214.

The light emitted from the reflection type polarizing plate 228 enters into the light input control layer 235. Here, the following is preferable as the light to enter the light input control layer 235. That is, at a view angle of 45° in the direction in which the optical functional layer can control the insident angle, the light to enter desirably has a brightness of no less than 10% and no more than 50% of the brightness at the front (normal direction of sheet), and more desirably no less than 20% and no more than 40%.

This is because: if the brightness is more than 50%, the control effect by the light input control layer is not obtained for light which is not controlled, such as light totally diffused; if the brightness is less than 10%, the view angle of the emitted light itself is already controlled, therefore the view angle control effect itself of the optical functional layer is not needed.

The light refracted at the light input control layer 235 transmits through the light transmissive portion of the optical functional layer 232, for example as the lights L171 and L172 (see FIG. 17), and is emitted to the liquid crystal panel from the base material layer 231 side. That is, light like the light L171 is refracted at the light input control layer 235, and changes its direction closer to the front direction to be emitted. This makes it possible to increase the brightness at the front direction.

In addition, light like the light L172 is refracted at the light input control layer 235, which makes the light reach the interface between the light transmissive portion 233 and the light absorbing portion 234 at a larger angle than the total reflection critical angle at the interface. As seen from FIG. 17, the light is totally reflected at the interface, and changes its direction to the front direction, to be emitted.

In addition, light entered having a so large angle as to be totally reflected even at the interface of the light transmissive portion 233 and the light absorbing portion 234 is absorbed at the light absorbing portion 234. Light like this is not preferable in view of controlling the view angle of an image display device, and can be properly absorbed at the light absorbing portion.

In this way, by the light input control layer 235 and the optical functional layer 232, light to be totally reflected at the optical functional layer 232 and the light input control layer 235 is increased, and even light conventionally absorbed at the light absorbing portion can be provided to the liquid crystal panel, which results in an increase of the brightness.

Further, the refraction at the light input control layer 235 and the total reflection at the optical functional layer 232 both control the view angle, and change the direction of light to a direction closer to the front. Therefore, even when used as in-vehicle use, the light input control layer 235 and the optical functional layer 232 inhibit the emission of light to the direction of a front glass, which makes it possible to prevent so-called background reflections.

The same is basically applied to the examples of the light input control layers 335 and 435 shown in FIGS. 18 and 19. The lights L181 and L182 in FIG. 18, and L191 and L192 in FIG. 19 travel in the same way as the lights L171 and L172.

As for the light input control layer 435 shown in FIG. 19, the top portion of the unit light input control element 435 does not have a curve or an inclined face. Therefore, unnecessary light diffusion, like L191, can be prevented. In addition, a leg portion 435b of the light input control layer 435 are each formed in a straight line, and arranged at a position close to the light absorbing portion. Therefore, it is possible to properly control light like L192 entered into a position close to the light absorbing portion, and change its direction to a direction in which the light is totally reflected efficiently.

Furthermore, the light path will be described. The light emitted from the surface light source device 220 as described above enters the lower polarizing plate 214 of the liquid crystal panel 215. Of the incident light, the lower polarizing plate 214 transmits one of the polarization components and absorbs the other polarization component. The light transmitted through the lower polarizing plate 214 is selectively transmitted through the upper polarizing plate 213 in accordance with the state of the application of the electric field on each pixel. In this manner, the liquid crystal panel 215 selectively transmits the light from the surface light source device 220 on a pixel to pixel basis, thereby enabling the observer of the liquid crystal display device to observe the image. At this time, the image light is provided to the observer via the functional film 240, therefore the quality of the image is increased.

In this embodiment, the above-mentioned members are each described as components to be arranged between the light input control layer 235 and the light source 225. However, the present invention is not limited to this configuration, and a known structure can be applied as long as adequate light can be emitted to the light input control layer 235. For example, a member having a plurality of convex shapes on the light guide plate side may be arranged between the light guide plate and the light input control layer.

According to the surface light source device including the optical sheet described above, and the image source unit and image display device including the surface light source device, it is possible to improve the brightness at the front direction and increase the use efficiency of light, while adequately controlling the view angle. For example, if the light transmissive portions and the light absorbing portions are extended in the horizontal direction and alternately arranged in the vertical direction, to be used in a vehicle, it is possible to inhibit the light emission on the upper side, therefore it is possible to prevent the light reflection to a front glass. On the other hand, to an observer at the front direction, a bright image can be provided.

EXAMPLES

Hereinafter, the present invention will be more specifically described. However, the invention is not limited by the Examples.

Example 1

(1) Preparation of a Composition for Constituting the Light-Transmissive Portion To a reactor, 40.0 parts by mass of bisphenol A-ethylene oxide 2 mole-adduct, 15.0 parts by mass of isophorone diisocyanate, and 0.02 parts by mass of bismuth tri(2-ethyl hexanoate) (50% solution of 2-ethyl hexanoic acid) as urethanizing catalyst were added and reacted at 80° C. for 5 hours; then, 5.0 parts by mass of 2-hydroxyethyl acrylate was added and reacted at 80° C. for 5 hours, to obtain a light-curable prepolymer (P1).

Then, 60.0 parts by mass of the light-curable prepolymer (P1), 15.0 parts by mass of phenoxyethyl acrylate as a reactive diluent monomer (M1), 25.0 parts by mass of diacrylate of bisphenol A-ethylene oxide 4 mole-adduct, 0.05 parts by mass of phosphate ester of tetradecanol-ethylene oxide 10 mole-adduct (as a mold release agent; monoester/diester=1/1 by mole ratio), 0.05 parts by mass of stearylamine ethylene oxide 15 mole-adduct, and 3.0 parts by mass of 1-hydroxycyclohexyl phenyl ketone (commodity name: "IRGACURE 184" manufactured by Ciba Speciality Chemicals) as a photopolymerization initiator (I1) were mixed and homogenized, to obtain a composition for constituting the light-transmissive portion.

The composition for constituting the light-transmissive portion thus obtained was applied with a thickness of 100 μm and cured by irradiating ultraviolet having an intensity of 800 mJ/cm² by using a high-pressure mercury vapor lamp. The refractive index of the cured composition at 589 nm measured by the Multiwavelength Abbe Refractometer ("DR-M4" manufactured by Atago Co., Ltd.) is 1.550.

(2) Base Material

As the base material, a polyethylene terephthalate (PET) film (commodity name: A4300, manufactured by Toyobo Co., Ltd., thickness: 100 μm) was used.

(3) Production of Die Roll

A die roll to be used for producing the optical functional layer was produced. The die roll is cylindrical and got plated with copper; the copper-plated portion was cut by turning tool (it may also be called "bite".) to form grooves having a shape corresponding to the shape of the light-transmissive portion. As the turning tool, a diamond bite was used. The tip of the diamond bite is shown in FIG. 13. A part of the bite from the tip to the level of 6 μm away from the tip has an outwardly projecting curved face; the width of the bite at the level of 6 μm away from the tip is 35 μm. The obliquity angle of the bite is 1.9° and the width of the bite at the level of 85 μm away from the tip is 41 μm.

By using the diamond bite and setting the intergroove pitch to 45 μm in the roll-axis direction, outer circumference of the copper-plated die roll was cut to form the grooves. Consequently, the grooves individually had a substantially trapezoid shape of which part from the 85 μm-deep bottom to the 6 μm-deep level had a curved face projecting toward the die roll side, of which width from the bottom to the 6 μm-deep level was 35 μm, and the width of the die roll surface side (i.e. at the level of 85 μm away from the bottom of the groove) was 41 μm. The cut roll was plated with chromium.

(4) Formation of the Light-Transmissive Portion

The base material of the above description (2) was fed between a nip roll and the die roll produced in accordance with the above description (3). At the same time, the composition for constituting the light-transmissive portion obtained in accordance with the description (1) was supplied from the feeder onto the base material layer; and then the composition for constituting the light-transmissive portion is filled between the base material layer and the die roll by pressure given between the die roll and the nip roll. Later, the composition for constituting the light-transmissive portion was cured by irradiating ultraviolet having an intensity of 800 mJ/cm² by a high-pressure mercury vapor lamp from the base material side to form the light-transmissive portion. Then, thus formed light-transmissive portion was released from the die roll by using mold-releasing nip, a sheet (i.e. an intermediate member) containing the light-transmissive portions and having a thickness of 205±20 μm was formed.

The elastic modulus of the light-transmissive portion was measured by pressuring (loading) a microindenter and removing the pressure by a compression microhardness tester (FISCHER HM2000). The load was 100 mN, loading velocity was 4 μm/10 seconds, and the holding time was 60 seconds. As a result, the elastic modulus of the light-transmissive portion was 800 MPa.

The shape of the light-transmissive portion at this phase was corresponding to the shape of the grooves of the die roll. Hence, the light-transmissive portion had protrusions having a height of about 6 μm along the opposite side of the base material layer.

(5) Preparation of the Composition for Constituting the Light-Absorbing Portion In a reactor, 20.0 parts by mass of oxirane, 2,2'-[(1-methylethylidene)bis(4,1-phenyleneoxymethylene)]bis-, homopolymer, 2-propenoate, as light-curable prepolymers (P2); 20.0 parts by mass of 2-phenoxyethyl acrylate, 20.0 parts by mass of α-acryloyl-ω-phenoxy poly(oxyethylene), and 13.0 parts by mass of 2-{2-[2-(acryloyloxy) (methyl) ethoxy](methyl)ethoxyl}(methyl) ethyl acrylate, as a reactive diluent monomer (M2); 20.0 parts by mass of acrylic cross-linked particulate (manufactured by Ganz Chemical Co., Ltd.) containing 25% carbon black having an average diameter of 4.0 μm as a light-absorbing particle; and 7.0 parts by mass of 1-hydroxycyclohexyl phenyl ketone ("IRGACURE 184" manufactured by Ciba Speciality Chemicals) as a photopolymerization initiator (I2) were mixed and homogenized, to obtain a composition for constituting the light-absorbing portion.

The composition obtained by removing the light-absorbing particle from the composition for constituting the light-absorbing portion was applied with a thickness of 10 μm and cured by irradiating ultraviolet having an intensity of 800 mJ/cm² by using a high-pressure mercury vapor lamp. The refractive index of the cured composition at 589 nm measured by the Multiwavelength Abbe Refractometer ("DR-M4" manufactured by Atago Co., Ltd.) is 1.547.

(6) Formation of the Light-Absorbing Portion

The composition for constituting the light-absorbing portion obtained in accordance with the description (5) was supplied on the intermediate member obtained in accordance with the description (4) from the feeder. Then, by using a doctor blade which was arranged in a direction substantially perpendicular to the moving direction of the intermediate member, the composition for constituting the light-absorbing portion thus supplied on the intermediate member was filled in the substantially V-shape grooves formed in the intermediate member (i.e. grooves between the light-transmissive portion) and the excessive amount of the composition for constituting the light-absorbing portion was strickled. Then, the remaining composition for constituting the light-absorbing portion was cured by irradiating ultraviolet having an intensity of 800 mJ/cm$^2$ by using a high-pressure mercury vapor lamp to form the light-absorbing portions (This process may be called "the first filling"). In this state, recess portions having a depth of 6 μm occurred on the surface of the light-absorbing portion.

(7) Preparation and Formation of the Covering Layer

In this Example, for the purpose of reducing the degree of the recess of the light-absorbing portion, covering layers were formed on the respective light-absorbing portion.

The preparation of the covering layer is as follows. In a reactor, 42.0 parts by mass of urethane acrylate and 18.0 parts by mass of epoxy acrylate oligomer as photopolymerization component; 35.0 parts by mass of tripropylene glycol diacrylate and 5.0 parts by mass of methoxy triethylene glycol acrylate as a light-curable monomer; 7.0 parts by mass of 1-hydroxycyclohexyl phenyl ketone (commodity name: "IRGACURE 184" manufactured by Ciba Speciality Chemicals) as a photopolymerization initiator were mixed and homogenized to obtain the composition for the covering layer.

The composition was applied with a thickness of 10 μm and cured by irradiating ultraviolet having an intensity of 800 mJ/cm$^2$ by using a high-pressure mercury vapor lamp. The refractive index of the cured composition at 589 nm measured by the Multiwavelength Abbe Refractometer ("DR-M4" manufactured by Atago Co., Ltd.) is 1.490.

The composition thus obtained was supplied from the feeder on the intermediate member obtained in accordance with the description (6). Then, by using a doctor blade which was arranged in a direction substantially perpendicular to the moving direction of the intermediate member, the composition for forming the covering layer thus supplied on the intermediate member was filled in the recess portion of the light-absorbing portion and the excessive amount of the composition was strickled (This process may be called "second filling").

Then, the composition for constituting the light-absorbing portion covering layer was cured by irradiating ultraviolet having an intensity of 800 mJ/cm$^2$ by using a high-pressure mercury vapor lamp. In this state, recess portions having a depth of 2 μm occurred on the surface of the light-absorbing portion.

It should be noted that the refractive index of the covering layer was set to the same as the refractive index of the adhesive layer; so, the above-described refraction of the light OCCURS at an interface between the covering layer and the recess portion of the first filling. Therefore, "the recess portion of the light-absorbing portion" in this context has the depth occurred at the time of the first filling.

(8) Formation of the Adhesive Layer

The adhesive layer was obtained by mixing: 100 parts by mass of an acrylic resin adhesive (commodity name: "SK dyne 2094" manufactured by Soken Chemical & Engineering Co., Ltd., solid content: 25.0 mass %, solvent: ethyl acetate and methylethyl ketone); 0.28 parts by mass of a crosslinking agent (commodity name: "E-5XM", "L-45", manufactured by Soken Chemical & Engineering Co., Ltd., solid content: 5.0 mass %); 0.25 parts by mass of 1,2,3-benzotriazole; and 32.0 parts by mass of diluting solvent (toluene/methylethyl ketone/cyclohexanone=27.69 g/27.69 g/4.61 g).

The composition was applied on a mold release film ("E 7007" manufactured by Toyobo Co., Ltd., thickness: 38 μm) and dried; then, the dried composition was stuck together with the optical functional layer.

The refractive index of the adhesive layer at 589 nm measured by the Multiwavelength Abbe Refractometer ("DR-M4" manufactured by Atago Co., Ltd.) is 1.490.

The storage elastic modulus of the adhesive layer is 0.22 MPa.

In this way, the optical sheet of Example 1 was produced.

Example 2

In Example 2, shape of the grooves of the die roll was changed so as to make the protrusion of the light-transmissive portion having a height of 3 μm. Other than this, Example 2 was carried out in the same manner as Example 1.

Example 3

In Example 3, a material having light-transmissive portions of which elastic modulus is 2000 MPa was used. The details are as follows.

In a reactor, 40.0 parts by mass of diacrylate of bisphenol-A diglycidyl ether, 10.0 parts by mass of diacrylate of bisphenol A-ethylene oxide 4 mole-adduct, 10.0 parts by mass of a mixture of pentaacrylate and hexaacrylate of dipentaerythritol (mass ratio: 60/40) as a light-curable prepolymer (P1); 0.05 parts by mass of phosphate ester of tetradecanol-ethylene oxide 10 mole-adduct (monoester/diester=1/1 by mole ratio) and 0.05 parts by mass of stearyl amine-ethylene oxide 15 mole-adduct as a mold release agent (S1); and 3.0 parts by mass of 1-hydroxycyclohexyl phenyl ketone (commodity name: "IRGACURE 184" manufactured by Ciba Speciality Chemicals) as a photopolymerization initiator were mixed and homogenized, to obtain the composition for constituting the light-transmissive portion.

The shape of the light-transmissive portion was the same as that of Example 1. The recess portion of the light-absorbing portion after the first filling had a depth of 3 μm; and the recess portion after the second filling had a depth of 1 μm.

Example 4

In Example 4, a material having light-transmissive portions of which elastic modulus is 1500 MPa was used. The details are as follows.

In a reactor, 5.0 parts by mass of diacrylate of bisphenol-A diglycidyl ether as a light-curable prepolymer (P1); 40.0 parts by mass of phenoxyethyl acrylate, 45.0 parts by mass of diacrylate of bisphenol A-ethylene oxide 4-mole adduct and 10.0 parts by mass of a mixture of pentaacrylate/hexaacrylate of dipentaerythritol (mass ratio: 60/40), as reactive diluent monomers (M1); 0.05 parts by mass of phosphate ester of tetradecanol-ethylene oxide 10-mole adduct (monoester/diester=1/1 by mole ratio) and 0.05 parts by mass of stearyl amine-ethylene oxide 15 mole-adduct as a mold release agent (S1); 3.0 parts by mass of 1-hydroxycyclohexyl phenyl ketone (commodity name: "IRGACURE 184" manufactured by Ciba Speciality Chemicals) as a photopolymerization initiator (I1) were mixed and homogenized, to obtain the composition for constituting the light-transmissive portion.

The shape of the light-transmissive portion was the same as that of Example 1. The recess portion of the light-absorbing portion after the first filling had a depth of 4 µm; and the recess portion after the second filling had a depth of 1.5 µm.

Example 5

In Example 5, a material having light-transmissive portions of which elastic modulus is 500 MPa was used. The details are as follows.

In a reactor, 10.0 parts by mass of diacrylate of bisphenol A diglycidyl ether as a light-curable prepolymer (P1); 50.0 parts by mass of phenoxyethyl acrylate, 30.0 parts by mass diacrylate of bisphenol A-ethylene oxide 4-mole adduct, and 10.0 parts by mass of a mixture of pentaacrylate/hexaacrylate of dipentaerythritol (mass ratio: 60/40) as a reactive diluent monomer (M1); 0.05 parts by mass of phosphate ester of tetradecanol-ethylene oxide 10-mole adduct (monoester/diester=1/1 by mole ratio) and 0.05 parts by mass of stearyl amine-ethylene oxide 15 mole-adduct as a mold release agent (S1); 3.0 parts by mass of 1-hydroxycyclohexyl phenyl ketone (commodity name: "IRGACURE 184" manufactured by Ciba Speciality Chemicals) as a photopolymerization initiator (I1) were mixed and homogenized, to obtain the composition for constituting the light-transmissive portion.

The shape of the light-transmissive portion was the same as that of Example 1. The recess portion of the light-absorbing portion after the first filling had a depth of 6.0 µm; and the recess portion after the second filling had a depth of 3.0 µm.

Example 6

In Example 6, a material of which light-transmissive portions has an elastic modulus of the obtained of 20 MPa was used. The details are as follows.

In a reactor, 10.0 parts by mass of 2,4-tolylene diisocyanate, 0.03 parts by mass of dilauryl di-n-butyl acid, 0.01 parts by mass of 2,6-di-t-butyl-p-cresol, 10.0 parts by mass of 2-hydroxyethyl acrylate, and 20.0 parts by mass of polytetramethylene glycol were mixed to obtain a light-curable prepolymer (P1).

Then, 40.0 parts by mass of the light-curable prepolymer (P1) thus obtained; 30.0 parts by mass of phenoxy tetraethylene glycol acrylate, 20.0 parts by mass of acrylate of p-cumylphenol-ethylene oxide 2-mole adduct, and 10.0 parts by mass of dipentaerythritol hexaacrylate as reactive diluent monomers (M1); 0.05 parts by mass of phosphate ester of tetradecanol-ethylene oxide 10-mole adduct (monoester/diester=1/1 by mole ratio) and 0.05 parts by mass of stearyl amine-ethylene oxide 15-mole adduct, as mold release agents (S1); 3.0 parts by mass of 1-hydroxycyclohexyl phenyl ketone (commodity name: WIRGACURE 184" manufactured by Ciba Speciality Chemicals) as a photopolymerization initiator (I1) were mixed and homogenized to obtain the composition for constituting the light-transmissive portion.

The shape of the light-transmissive portion was the same as that of Example 1. The recess portion of the light-absorbing portion after the first filling had a depth of 8 µm; and the recess portion after the second filling had a depth of 5 µm.

Example 7

In Example 7, a material of which light-transmissive portions have an elastic modulus of 2500 MPa was used. The details are as follows.

In a reactor, 40.0 parts by mass of diacrylate of bisphenol A diglycidyl ether as a light-curable prepolymer (P1); 50.0 parts by mass of phenoxyethyl acrylate and 10.0 parts by mass of a mixture of pentaacrylate/hexaacrylate of dipentaerythritol (mass ratio: 60/40), as reactive diluent monomers (M1); 0.05 parts by mass of phosphate ester of tetradecanol-ethylene oxide 10-mole adduct (monoester/diester=1/1 by mole ratio) and 0.05 parts by mass of stearyl amine-ethylene oxide 15 mole-adduct as mold release agents (S1); 3.0 parts by mass of 1-hydroxycyclohexyl phenyl ketone (commodity name: "IRGACURE 184" manufactured by Ciba Speciality Chemicals) as a photopolymerization initiator (I1) were mixed and homogenized, to obtain the composition for constituting the light-transmissive portion.

The shape of the light-transmissive portion was the same as that of Example 1. The recess portion of the light-absorbing portion after the first filling had a depth of 2 µm; and the recess portion after the second filling had a depth of 0.4 µm.

Example 8

In Example 8, a material of which light-transmissive portions have am elastic modulus of 9.0 MPa was used. The details are as follows.

In a reactor, 10.0 parts by mass of 2,4-tolylene diisocyanate, 0.03 parts by mass of dilauryl di-n-butyl acid, 0.01 parts by mass of 2,6-di-t-butyl-p-cresol, 10.0 parts by mass of 2-hydroxyethyl acrylate, and 20.0 parts by mass of polytetramethylene glycol were mixed to obtain a light-curable prepolymer (P1).

Then, 40.0 parts by mass of the light-curable prepolymer (P1) thus obtained; 15.0 parts by mass of phenoxyethyl acrylate, 15.0 parts by mass of phenoxy tetraethylene glycol acrylate, and 20.0 parts by mass of acrylate of p-cumylphenol-ehylene oxide 2-mole adduct as reactive diluent monomers (M1); 0.05 parts by mass of phosphate ester of tetradecanol-ethylene oxide 10-mole adduct (monoester/diester=1/1 by mole ratio) and 0.05 parts by mass of stearyl amine-ethylene oxide 15-mole adduct as mold release agents (S1); 3.0 parts by mass of 1-hydroxycyclohexyl phenyl ketone (commodity name: "IRGACURE 184" manufactured by Ciba Speciality Chemicals) as a photopolymerization initiator (I1); and 10.0 parts by mass of other tetra ethylene glycol diacrylate were mixed and homogenized to obtain the composition for constituting the light-transmissive portion.

The shape of the light-transmissive portion was the same as that of Example 1. The recess portion of the light-absorbing portion after the first filling had a depth of 9 µm; and the recess portion after the second filling had a depth of 6.5 µm.

Example 9

In Example 9, an optical sheet which had an adhesive layer formed on the recess portion side of the optical functional layer was formed, wherein the adhesive composition for forming the adhesive layer had a storage elastic modulus of 0.14 MPa. Except for the adhesive layer, components of Example 9 are the same as those of Example 1. The details of the adhesive layer are as follows.

To 300 parts by mass of ethyl acetate, 50.0 parts by mass of n-butyl acrylate, 30.0 parts by mass of methyl acrylate, 19.5 parts by mass of methyl methacrylate, 0.5 parts by mass of 2-hydroxyethyl acrylate, 0.2 parts by mass of azobisisobutyronitrile as an initiator were added and stirred at 60° C. for 12 hours to obtain an acrylic acid ester copolymer solution.

Then, based on 100 parts by mass of solid portion of the obtained copolymer solution, 0.5 parts by mass of isocyanate-based crosslinking agent, i.e. "TD-75" (manufactured by Soken Chemical & Engineering Co., Ltd.) as a crosslinking agent was added and the mixture was diluted with 2-butanone to be a solution having a concentration of 25 mass %, to obtain an adhesive solution.

The solution was applied with a thickness of 25 μm on a mold release film ("SE 7007" manufactured by Toyobo Co., Ltd., thickness: 38 μm) and dried; further, another mold release film ("E 7006" manufactured by Toyobo Co., Ltd., thickness: 38 μm) was stuck thereon to form a non-carrier adhesive film.

Example 10

In Example 10, an optical sheet which had an adhesive layer formed on the recess portion side of the optical functional layer was formed, wherein an adhesive composition for forming the adhesive layer had a storage elastic modulus of 0.78 MPa. Except for the adhesive layer, components of Example 10 are the same as those of Example 1. The formation of the adhesive layer will be described as follows.

To 300 parts by mass of ethyl acetate, 50.0 parts by mass of n-butyl acrylate, 30.0 parts by mass of methyl acrylate, 0.5 parts by mass of 2-hydroxyethyl acrylate, 19.5 parts by mass of N,N-dimethyl acrylamide, 0.2 parts by mass of azobisisobutyronitrile as an initiator, were added and stirred at 60° C. for 12 hours to obtain acrylic acid ester copolymer solution.

Then, based on 100 parts by mass of solid portion of the copolymer solution, 0.5 parts by mass of isocyanate-based crosslinking agent, i.e. "TD-75" (manufactured by Soken Chemical & Engineering Co., Ltd.) as a crosslinking agent was added and the mixture was diluted with 2-butanone to be an adhesive solution having a concentration of 25 mass %, to obtain an adhesive solution.

The solution was applied with a thickness of 25 μm on a mold release film ("E 7007" manufactured by Toyobo Co., Ltd., thickness: 38 μm) and dried; further, another mold release film ("E 7006" manufactured by Toyobo Co., Ltd., thickness: 38 μm) was stuck thereon to form a non-carrier adhesive film.

Example 11

In Example 11, an optical sheet which had an adhesive layer formed on the recess portion side of the optical functional layer was formed, wherein an adhesive composition for forming the adhesive layer had a storage elastic modulus of 0.09 MPa. Except for the adhesive layer, components of Example 11 are the same as those of Example 1. The formation of the adhesive layer will be described as follows.

To 300 parts by mass of ethyl acetate, 75.0 parts by mass of n-butyl acrylate, 20.0 parts by mass of methyl acrylate, 5.0 parts by mass of 2-hydroxyethyl acrylate, 0.2 parts by mass of azobisisobutyronitrile as an initiator were added and stirred at 60° C. for 12 hours to obtain an acrylic acid ester copolymer solution.

Then, based on 100 parts by mass of solid portion of the copolymer solution, 0.5 parts by mass of isocyanate-based crosslinking agent, i.e. "TD-75" (manufactured by Soken Chemical & Engineering Co., Ltd.) as a crosslinking agent was added and the mixture was diluted with 2-butanone to be a solution having a concentration of 25 mass %, to obtain an adhesive solution.

The solution was applied with a thickness of 25 μm on a mold release film ("E 7007" manufactured by Toyobo Co., Ltd., thickness: 38 μm) and dried; further, another mold release film ("E 7006" manufactured by Toyobo Co., Ltd., thickness: 38 μm) was stuck thereon to form a non-carrier adhesive film.

Example 12

In Example 12, an optical sheet which had an adhesive layer formed on the recess portion side of the optical functional layer was formed, wherein an adhesive composition for forming the adhesive layer had a storage elastic modulus of 1.1 MPa. Except for the adhesive layer, components of Example 12 are the same as those of Example 1. The formation of the adhesive layer will be described as follows.

To 300 parts by mass of ethyl acetate, 45.0 parts by mass of n-butyl acrylate, 30.0 parts by mass of methyl acrylate, 0.5 parts by mass of 2-hydroxyethyl acrylate, 24.5 parts by mass of N,N-dimethyl acrylamide, 0.2 parts by mass of azobisisobutyronitrile as an initiator were added and stirred at 60° C. for 12 hours to obtain an acrylic acid ester copolymer solution.

Then, based on 100 parts by mass of solid portion of the copolymer solution, 0.5 parts by mass of isocyanate-based crosslinking agent, i.e. "TD-75" (manufactured by Soken Chemical & Engineering Co., Ltd.) as a crosslinking agent was added and the mixture was diluted with 2-butanone to be a solution having a concentration of 25 mass %, to obtain an adhesive solution.

The solution was applied with a thickness of 25 μm on a mold release film ("E 7007" manufactured by Toyobo Co., Ltd., thickness: 38 μm) and dried; further, another mold release film ("E 7006" manufactured by Toyobo Co., Ltd., thickness: 38 μm) was stuck thereon to form a non-carrier adhesive film.

Example 13

In Example 13, an optical sheet of Example 1 in which recess portions of the light-absorbing portion were disappeared by the first filling was formed. Specifically, so as not to form the recess portion, the amount of the composition for constituting the light-absorbing portion to be strickled was reduced by lowering strickling pressure of the doctor blade.

Comparative Example

In Comparative example, a die roll was produced with cutting bites (cutting tip) which do not have projecting curved portion in the tip, then, a light-transmissive portion was obtained. Other than the die roll, conditions of Comparative example are the same as those of Example 1. The optical sheet of Comparative example is a conventional optical sheet.

With respect to the above Examples 1-13 and Comparative example, an original optical sheet adhered in the plasma displays (commodity name: "VIERA G2", 50 inch-wide, manufactured by Panasonic corporation) were peeled and the optical sheets of Examples and Comparative example were respectively stucked to the plasma displays. The protrusion of the light-transmissive portion was arranged so that it faces the PDP side. Then, the total white brightness at respective view angles were measured in a darkroom. The total white brightness in the darkroom when no optical sheet was adhered in the plasma display was 140 cd/m². Apart of the conditions of each optical sheet is shown in Table 1 and the measurement results of the brightness are shown in Table 2.

TABLE 1

| | Height of Protrusion of Light-transmissive portion (μm) | Depth of Recess portion of Light-absorbing portion (1st filling) (μm) | Depth of Recess portion of Light-absorbing portion (2nd filling) (μm) | Elastic modulus of Light-absorbing portion (MPa) | Storage elastic modulus of Adhesive layer (MPa) |
|---|---|---|---|---|---|
| Example 1 | 6 | 6.0 | 2.0 | 800 | 0.22 |
| Example 2 | 3 | 6.0 | 2.0 | 800 | 0.22 |
| Example 3 | 6 | 3.0 | 1.0 | 2000 | 0.22 |
| Example 4 | 6 | 4.0 | 1.5 | 1700 | 0.22 |
| Example 5 | 6 | 6.0 | 3.0 | 500 | 0.22 |
| Example 6 | 6 | 8.0 | 5.0 | 20 | 0.22 |
| Example 7 | 6 | 2.0 | 0.4 | 2500 | 0.22 |
| Example 8 | 6 | 9.0 | 6.5 | 9 | 0.22 |
| Example 9 | 6 | 6.0 | 2.0 | 800 | 0.14 |
| Example 10 | 6 | 6.0 | 2.0 | 800 | 0.78 |
| Example 11 | 6 | 6.0 | 2.0 | 800 | 0.09 |
| Example 12 | 6 | 6.0 | 2.0 | 800 | 1.1 |
| Example 13 | 6 | 0.0 | — | 800 | 0.22 |
| Comparative example | 0 | 6.0 | 2.0 | 800 | 0.22 |

TABLE 2

| | Brightness of each View angle (cd/m²) | | | | |
|---|---|---|---|---|---|
| | View angle 0° | View angle 15° | View angle 30° | View angle 45° | View angle 60° |
| Example 1 | 118.2 | 86.1 | 54.5 | 29.9 | 18.1 |
| Example 2 | 118.9 | 86.2 | 54.6 | 29.9 | 18.3 |
| Example 3 | 117.1 | 84.9 | 51.7 | 27.5 | 17.3 |
| Example 4 | 117.9 | 85.5 | 52.7 | 28.3 | 17.7 |
| Example 5 | 118.2 | 86.1 | 54.5 | 29.9 | 18.1 |
| Example 6 | 123.2 | 87.9 | 56.7 | 32.7 | 19.4 |
| Example 7 | 115.4 | 84.8 | 51.6 | 26.9 | 17.2 |
| Example 8 | 125.2 | 88.7 | 58.0 | 33.9 | 19.7 |
| Example 9 | 118.2 | 86.1 | 54.5 | 29.9 | 18.1 |
| Example 10 | 118.2 | 86.1 | 54.5 | 29.9 | 18.1 |
| Example 11 | 118.2 | 86.1 | 54.5 | 29.9 | 18.1 |
| Example 12 | 118.2 | 86.1 | 54.5 | 29.9 | 18.1 |
| Example 13 | 118.2 | 86.1 | 54.5 | 29.9 | 18.1 |
| Comparative example | 114.4 | 83.4 | 51.3 | 26.6 | 17.0 |

As seen from Tables 1 and 2, The optical sheets of which light-transmissive portion has protrusions exhibited higher brightness compared with Comparative example at each view angle, thereby improved the use efficiency of the light. Degree of brightness seen from a position normal to the front face (i.e. view angle: 0°) is particularly large, and front brightness can be improved.

In Example 7 where the elastic modulus of the light-transmissive portion is high, the light-transmissive portion was hard, so that it tended to be broken during production; thereby the production was difficult. On the other hand, in Example 8 where the elastic modulus of the light-transmissive portion is low, the light-transmissive portion was soft, so that recess portion became larger when forming the light-absorbing portion. Therefore, there is a problem in production such that bubbles tend to be easily included when forming the adhesive layer.

In Example 11 where the storage elastic modulus of the adhesive composition is low, the adhesive composition of the adhesive layer was soft, so that problems of the recess distortion tended to occur; thereby there is a problem in production of an optical filter in good quality. In Example 12 where the storage elastic modulus of the adhesive composition is high, the adhesive composition of the adhesive layer was hard, so that the adhesive layer was not well-embedded in the optical functional layer face; thereby bubbles tended to be included, which resulted in poor appearance. In other Examples, the adhesive layer was well-embedded in the optical functional layer face and no recess distortion occured by foreign materials during the production process; overall, optical sheets in good quality were easily produced.

Example 14

As Example 14, an optical sheet corresponding to the above-described optical sheet 220 was produced to make a surface light source device, and combined with a liquid crystal panel. As the liquid crystal panel, a 6.5 inch liquid crystal panel (LQ065T5GG03, manufactured by SHARP CORPORATION) was used. The optical sheet was arranged in such a manner that the light transmissive portions and the light absorbing portions of the optical functional layer were extended in the horizontal direction and alternately arranged in the vertical direction. Specific structure of the optical sheet is as follows.
(Base Material Layer)
material: polycarbonate film
thickness: 130 μm
roughened face: the face opposite to the face where the optical functional layer was arranged was made to be a roughened face having an arithmetic average roughness (Ra) of 0.4 μm. Whereby, the haze of the base material layer was 20.
(Optical Functional Layer)
pitch (see FIG. 16): $P_k$=39 μm;
width of the upper base of the light absorbing portion: 4 μm ($W_a$ in FIG. 16);
width of the lower base of the light absorbing portion: 10 μm ($W_b$ in FIG. 16);
thickness of the light absorbing portion: 102 μm ($D_k$ in FIG. 16); thickness of the optical functional layer: 127 μm;
material and refractive index of the light transmissive portion: ultraviolet curable urethane acrylate, refractive index 1.56; material and refractive index of light absorbing portion: ultraviolet curable urethane acrylate having a refractive index of 1.49 in which 25 mass % of acrylic beads including carbon black were dispersed.
(Light Input Control Layer)
The light input control layer was formed integrally with the light transmissive portion, whose surfaces were made to be curved. The thickness of the light input control layer shown by H in FIG. 16 was 6 μm.

Example 15

In Example 15, the cross sectional shape of the light input control layer was made to be a trapezoid, following the example in FIG. 19. The thickness of the light input control layer, shown by H" in FIG. 19, was 6 μm. Other portions were same as in Example 14.

Comparative Example 2

In Comparative Example 2, the light input control layer was not formed. Other layers were same as in Example 14.
<Evaluation Method>
In the evaluation, as a liquid crystal module, LQ065T5GG03 (6.5 inches) manufactured by SHARP CORPORATION was used as described above. As a brightness meter, LS-110 manufactured by Konica Minolta, Inc. was used. By means of them, measured were the front brightness when only a backlight was used and the front brightness when the optical sheet according to each example described above was installed on the outermost face of the backlight.
<Results>
Setting the brightness of only the backlight as 100%, the percentage of the brightness when the optical sheet was installed on the outermost face of the backlight was evaluated as a transmission ratio. As a result, the transmission ratios of Examples 14 and 15 were both higher than that of Comparative Example 2. In addition, the improvement of the upper side transmission ratio was remarkably seen in Example 15.

DESCRIPTION OF THE REFERENCE NUMERALS

10 optical sheet
11 base material layer
12 optical functional layer
13 light-transmissive portion
14 light-absorbing portion
15 binder
16 light-absorbing particle
17 protrusion
18 recess portion
20 adhesive layer
21 electromagnetic wave shielding layer
22 wavelength filter layer
23 antireflection layer
210 image source unit
215 liquid crystal panel
220 surface light source device
221 light guide plate
225 light source
226 light diffuser plate
227 prism layer
228 reflection type polarizing plate
230 optical sheet
235 light input control layer
235*a* unit light input control element
239 reflection sheet
240 functional sheet

The invention claimed is:

1. An image source unit comprising: a light source; and an optical sheet laminated on the light source,
wherein
the optical sheet includes: a base material layer; an optical functional layer formed on the light source side surface of the base material layer; and an adhesive layer,
the optical functional layer includes: light-transmissive portions extending in one direction and arranged parallel in a direction different from said one direction in a light transmissive manner along the sheet face, having elastic modulus of 800 MPa or more and 2000 MPa or less; and light-absorbing portions arranged between the light-transmissive portions, whose refractive index is set smaller than that of the light-transmissive portions,
the light source side face of the light-transmissive portions includes unit light input control elements so that the unit light input control elements project towards the light source side in cross section in the sheet-thickness direction, the light-absorbing portions not being arranged between the unit light input control elements,
the light source side face of the light-absorbing portions has a recess portion so that the bottom of the recess portion faces the opposite side from the light source and formed in curved or polygonal manner in cross section in the sheet-thickness direction, wherein depth of the recess portion of the light-absorbing portion is in the range of 0.5-6 μm,
the adhesive layer is layered on the light source side face of the optical functional layer and has a refractive index lower than that of the light-transimissive portions, and
the storage elastic modulus of an adhesive for forming the adhesive layer is 0.22 MPa or more and 0.8 MPa or less.

2. The image source unit according to claim 1, wherein the light absorbing portion is arranged in a light absorbing manner by being filled with a material which includes light-absorbing particles having an average diameter of 1.0 μm or more and 20 μm or less dispersed in a binder at a rate of 3 mass % or more and less than 10 mass %.

3. The image source unit according to claim 1, wherein the light source side of the light-absorbing portions is covered with a covering layer.

4. The image source unit according to claim 1, wherein the thickness of the adhesive layer is 20 μm or more and 50 μm or less.

5. The image source unit according to claim 1, wherein the unit light input element and a reflection type polarizing plate are bonded to each other by an adhesive.

6. An image display unit comprising the image source unit according to claim 1.

* * * * *